(12) United States Patent
Aradachi et al.

(10) Patent No.: US 7,145,314 B2
(45) Date of Patent: Dec. 5, 2006

(54) DC POWER SOURCE UNIT WITH BATTERY CHARGING FUNCTION

(75) Inventors: Takao Aradachi, Hitachinaka (JP);
Takeshi Takeda, Hitachinaka (JP);
Hidekazu Harada, Hitachinaka (JP);
Nobuhiro Takano, Hitachinaka (JP);
Kenrou Ishimaru, Hitachinaka (JP);
Kazuhiko Funabashi, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 372 days.

(21) Appl. No.: 10/849,868

(22) Filed: May 21, 2004

(65) Prior Publication Data

US 2004/0232892 A1     Nov. 25, 2004

(30) Foreign Application Priority Data

May 23, 2003  (JP)  ............................ P2003-145698
Jul. 11, 2003  (JP)  ............................ P2003-195641

(51) Int. Cl.
*H01M 10/46*   (2006.01)

(52) U.S. Cl. ............................................. 320/150

(58) Field of Classification Search ............... 320/114, 320/115, 150, 152, 153
See application file for complete search history.

(56) References Cited

U.S. PATENT DOCUMENTS 6,104,162 A     8/2000  Sainsbury 6,204,639 B1    3/2001  Takano et al.
6,566,843 B1    5/2003  Takano et al.
7,064,523 B1*   6/2006  Aradachi et al. ........... 320/150
2001/0048289 A1 12/2001 Sakakibara

FOREIGN PATENT DOCUMENTS

EP          1 291 098       11/2002
EP          1 291 999        3/2003
JP          2000-184614      6/2000

* cited by examiner

*Primary Examiner*—Edward H. Tso
(74) *Attorney, Agent, or Firm*—Antonelli, Terry, Stout and Kraus, LLP.

(57) ABSTRACT

A DC power source unit supplies a DC voltage to a power tool through an adapter when a power switch of the tool is turned ON and also charges a battery pack used as an alternative power source of the tool when the power tool is not operated. A minimum battery temperature gradient amongst battery temperature gradients ever computed is used to determine whether the battery pack has cooling effect when forcibly cooled by a cooling fan or whether the battery pack has reached a full charge condition. When charging the battery pack is interrupted due to operation of the power tool, computing the battery temperature gradient is halted for some time or determination of the battery pack's full charge condition is not performed for some time in order to prevent the minimum battery temperature from being updated during interruption of charging of the battery pack.

14 Claims, 17 Drawing Sheets

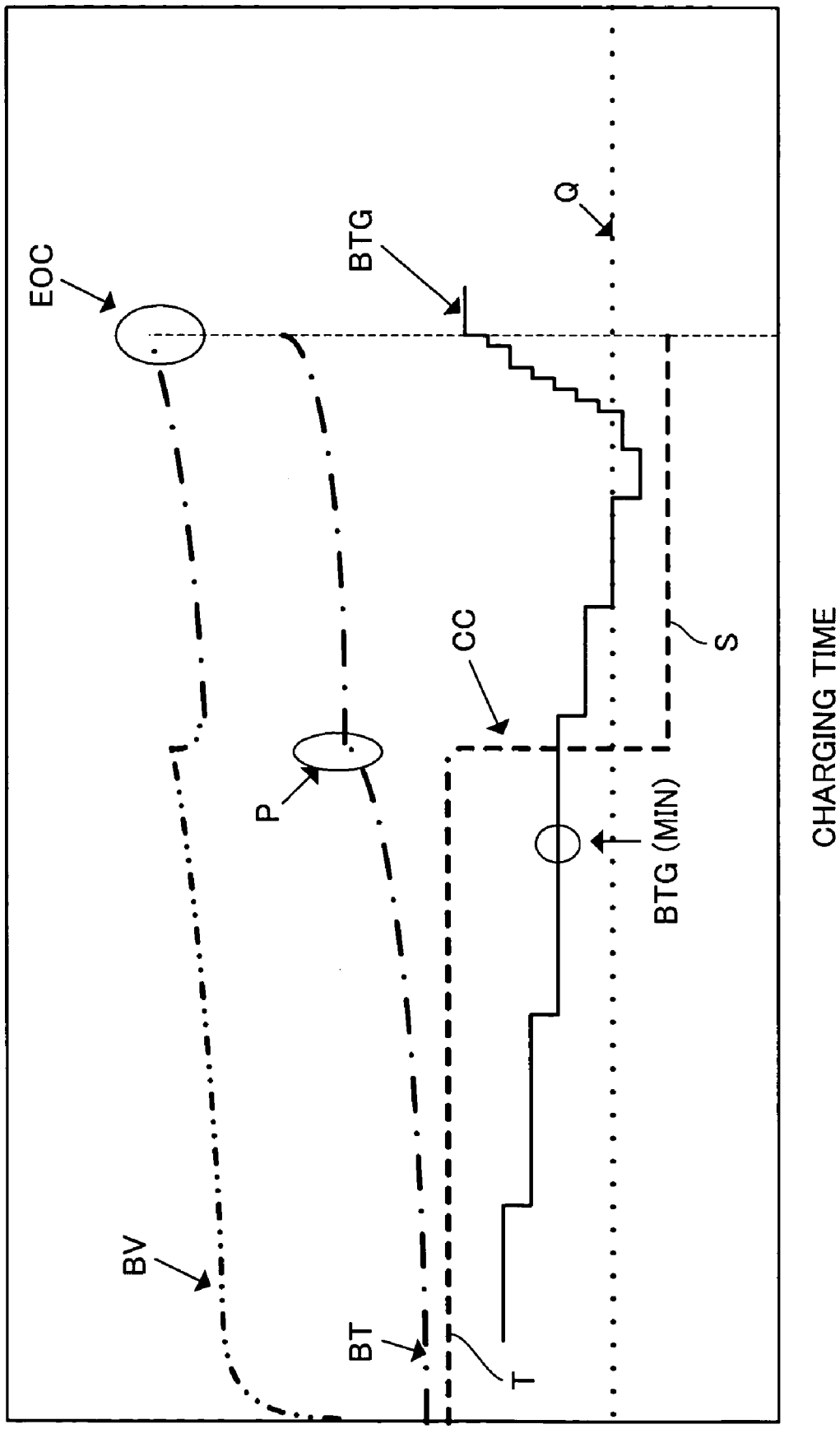

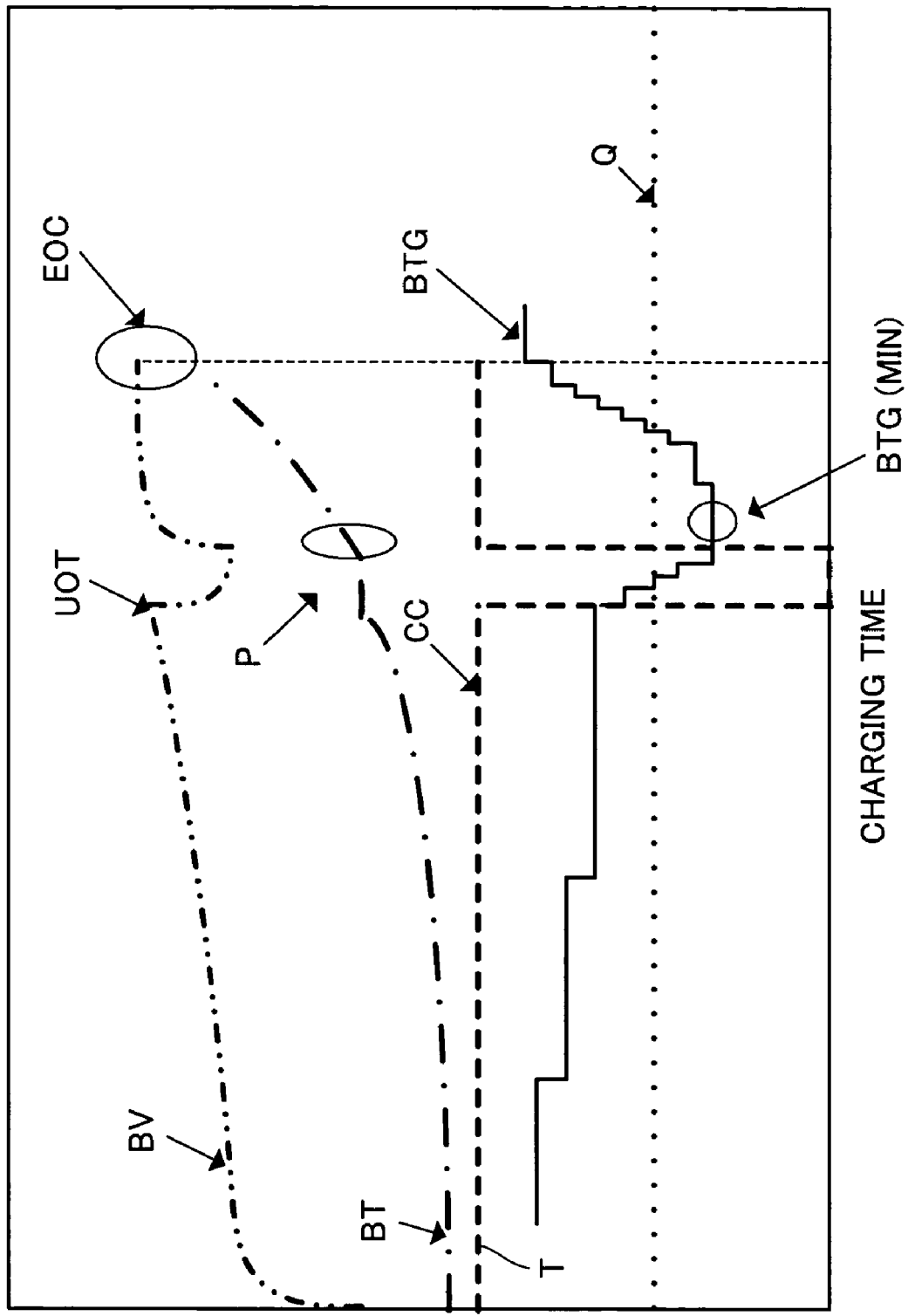

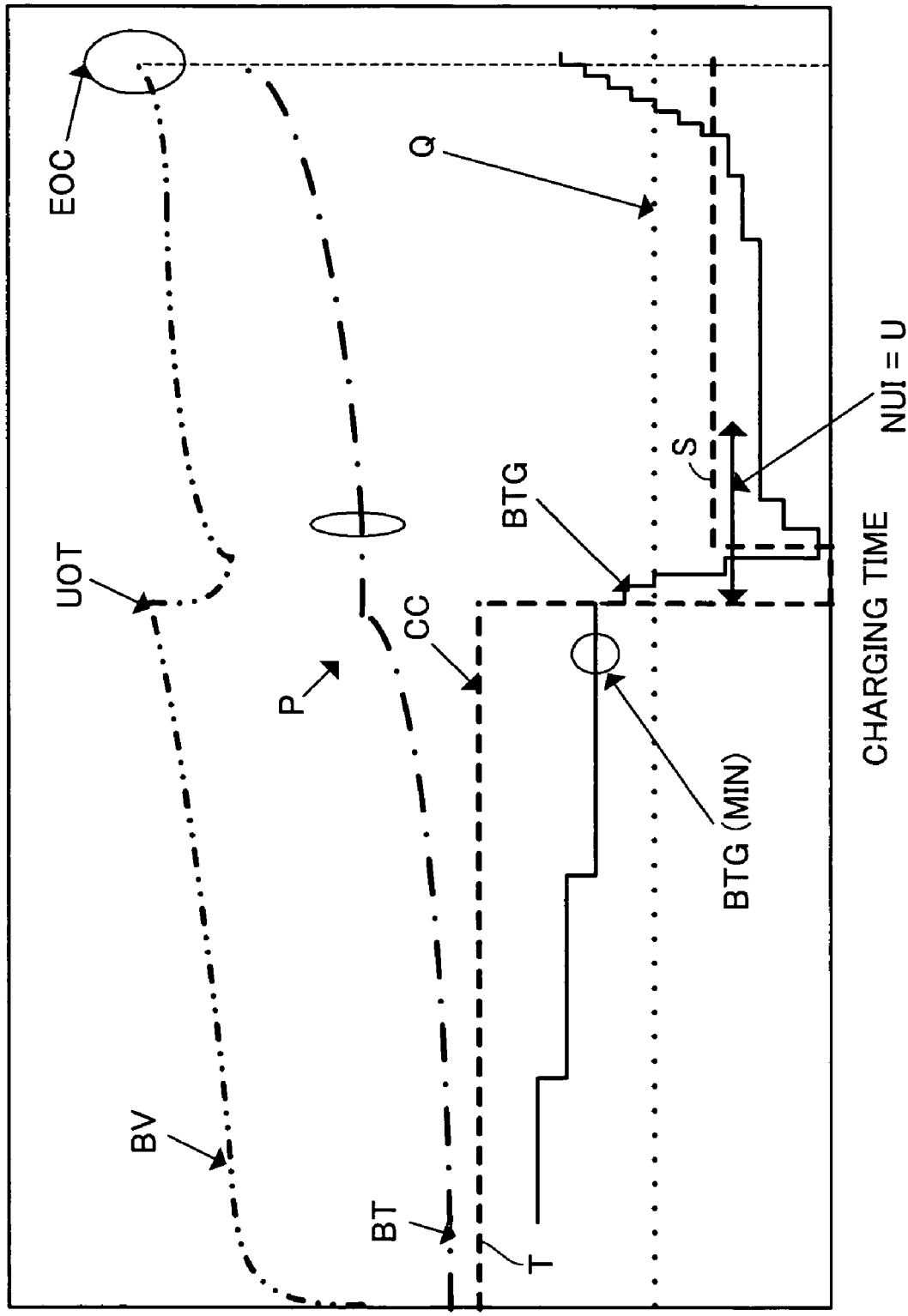

DC POWER SOURCE UNIT WITH BATTERY CHARGING FUNCTION

BACKGROUND OF THE INVENTION

1. Field of the Invention

The present invention relates to a DC power source unit that can selectively charge a battery pack, which is used as a power source for a cordless power tool, and supply DC voltage to the cordless power tool through an adaptor shaped like the battery pack.

2. Description of the Related Art

Cordless power tools are convenient because they can be used anywhere without being restricted by the length of a power cable. However, whenever the battery runs low, the battery pack needs to be removed and charged or else replaced with another battery pack that has already been charged.

A DC power source unit that converts alternating current to direct current can be used along with the battery pack. That is, the DC power source unit can be used when the cordless power tool is to be operated in a single place that has a source of alternating current, and the battery pack can be used when the cordless power tool is to be operated at several different places that have no source of alternating current. However, this situation has a problem in that the operator of the cordless power tool must carry both the DC power source unit and the battery pack's charging unit to the work area.

Japanese Patent Application Publication No. 2000-184614(A) discloses a DC power source unit with a battery charging function. When the DC power source unit detects that the attached cordless power tool is being operated, it supplies power only to the cordless power tool and not for charging purposes. On the other hand, when the DC power source unit detects that the power tool is not being operated, then it charges a battery pack.

When a battery temperature gradient is used as a parameter to determine a full charge condition of the battery pack, an inaccurate determination of the full charge condition may result because the battery temperature gradient tends to lower during the charge interruption period.

Battery packs with nickel-cadmium or nickel-hydrogen batteries incorporated therein will reach a full charge condition in a short period of time if they are charged with a relatively large current. However, charging the battery pack with a large current generates a large amount of heat from the battery, thereby causing the cycle lifetime of the battery pack to shorten. In order to suppress generation of heat from the battery, it has been proposed to forcibly cool the battery using a cooling fan during charging. Forcibly cooling the battery allows a large current to be supplied to the battery. The battery packs to which the forcible cooling is applicable and the battery packs to which the forcible cooling is not applicable are different in structure. The former battery packs are formed with air inlet/outlet holes and the latter battery packs are not. Because there is little cooling effect in the battery packs with no air inlet/outlet holes, such battery packs are to be charged with a small current. In this manner, the battery packs are charged with different charging modes depending upon whether the battery packs are adapted for the forcible cooling.

When the battery temperature gradient is used as a parameter to determine the type of the battery packs, the same problems arise because the battery temperature gradient tends to lower during the charge interruption period.

SUMMARY OF THE INVENTION

In view of the foregoing, it is an object of the present invention to provide a DC power source unit having a battery charging function in which a full charge condition of the battery pack can be accurately determined even if charging the battery pack is interrupted for some time.

Another object of the invention is to provide a DC power source unit having a battery charging function in which types of battery packs can be accurately determined based on battery temperature gradients even if charging the battery pack is interrupted for some time.

To achieve the above and other objects, there is provided, according to one aspect of the invention, a DC power source unit used as a power source of a tool and having a charging function for charging a battery pack used as an alternative power source of the tool. The DC power source unit includes a battery pack connecting portion that connects the battery pack to charge with DC power, an adapter that supplies DC power to the tool, a power output switching circuit that switches between supplying the DC power to the tool through the adapter and charging the battery pack, a cooling device that cools the battery pack, a battery temperature detector that detects at every predetermined timing a temperature of the battery pack and outputs a temperature signal indicative of the temperature of the battery pack, a first storage device that stores the temperature signal output from the battery temperature detector, battery temperature gradient computing means for periodically computing a battery temperature gradient based on a currently detected temperature signal and an earlier detected battery temperature signal and outputting at every predetermined timing a BTG signal indicative of the battery temperature gradient, a second storage device that stores the BTG signal output from the battery temperature gradient computing means, and minimum value storing means for storing and updating a minimum value of the BTG signal amongst BTG signals ever computed by the battery temperature gradient computing means. The minimum value storing means does not update the minimum value of the BTG signal for a predetermined duration of time from a time when the power output switching circuit starts supplying the DC power to the tool to a time when a predetermined period of time has expired from resumption of charge of the battery pack immediately after supplying the DC power to the tool is ended.

According to another aspect of the invention, there is provided a DC power source unit used as a power source of a tool and having a charging function for charging a battery pack used as an alternative power source of the tool. The DC power source unit includes a battery pack connecting portion, an adapter, a power output switching circuit, a battery temperature detector, a first storage device, battery temperature gradient computing means, a second storage device, minimum value storing means, full charge determining means for determining that the battery pack has reached a full charge condition when a newest BTG signal has a value greater by a predetermined full charge discriminating value than the minimum value of the BTG signal stored in the minimum value storing means, and control means for controlling the full charge determining means so that when the power output switching circuit supplies the DC power to the tool during the battery pack is being charged, and thereafter stops supplying the DC power to the tool and resumes charging the battery pack, the full charge determining means is disabled before expiration of a predetermined period of time from resumption of charging the battery pack.

According to still another aspect of the invention, there is provided a DC power source unit including a battery pack connecting portion, an adapter, a power output switching circuit, a battery temperature detector, a first storage device, battery temperature gradient computing means, a second storage device, minimum value storing means, full charge determining means, and control means. The full charge determining means determines that the battery pack has reached a full charge condition when a newest BTG signal has a value greater than a sum of a predetermined full charge discriminating BTG value and the minimum value of the BTG signal stored in the minimum value storing means or when a newest temperature signal output from the battery temperature detector has exceeded a predetermined full charge discriminating battery temperature value. The control means controls the battery temperature gradient computing means so that when the power output switching circuit supplies the DC power to the tool during the battery pack is being charged, and thereafter stops supplying the DC power to the tool and resumes charging the battery pack, the battery temperature gradient computing means does not compute the battery temperature gradient for a predetermined period of time if the newest temperature signal indicates that the battery temperature has not exceeded a near full charge battery temperature value lower than the predetermined full charge discriminating battery temperature value.

According to yet another object of the invention, there is provided a DC power source unit that includes a battery pack connecting portion, an adapter, a power output switching circuit, a battery voltage detector that detects at every predetermined timing a voltage of the battery pack and outputs a voltage signal indicative of the voltage of the battery pack, a first storage device that stores the voltage signal output from the battery voltage detector, battery voltage gradient computing means for periodically computing a battery voltage gradient based on a currently detected voltage signal and an earlier detected voltage signal and outputting at every predetermined timing a BVG signal indicative of the battery voltage gradient, a second storage device that stores the BVG signal output from the battery voltage gradient computing means, full charge determining means for determining that the battery pack has reached a full charge condition when a newest BVG signal has exceeded a first predetermined value and thereafter fallen below a second predetermined value smaller than the first predetermined value, and control means for controlling the battery voltage gradient computing means so that when the power output switching circuit supplies the DC power to the tool during the battery pack is being charged, and thereafter stops supplying the DC power to the tool and resumes charging the battery pack, the battery voltage gradient computing means does not compute the battery voltage gradient for a predetermined period of time if a newest BVG signal indicates that a newest battery voltage gradient has not exceeded the first predetermined value.

BRIEF DESCRIPTION OF THE DRAWINGS

The above and other objects, features and advantages of the invention will become more apparent from reading the following description of the embodiment taken in connection with the accompanying drawings in which:

FIG. 5B is a graphical representation of a battery voltage (BV), a battery temperature (BT), a charge current (CC), and a battery temperature gradient (BTG) wherein CC is lowered when the battery pack is determined to be of no cooling effect;

FIG. 5C is a graphical representation of a battery voltage (BV), a battery temperature (BT), a charge current (CC), and a battery temperature gradient (BTG) wherein a battery pack with no cooling effect is erroneously detected as being the one with cooling effect because of interruption of charging of the battery pack occurred before detection;

FIG. 5D is a graphical representation of a battery voltage (BV), a battery temperature (BT), a charge current (CC), and a battery temperature gradient (BTG) wherein a full charge of a battery pack is detected accurately by providing a BTG non-updating interval (NUI) after charging of the battery pack is resumed;

DETAILED DESCRIPTION OF THE PREFERRED EMBODIMENTS

A direct current (DC) power source unit 100 according to a first embodiment of the present invention will be described while referring to FIGS. 1, 2A, 3A–3B and 5A–5D.

Figure 1:
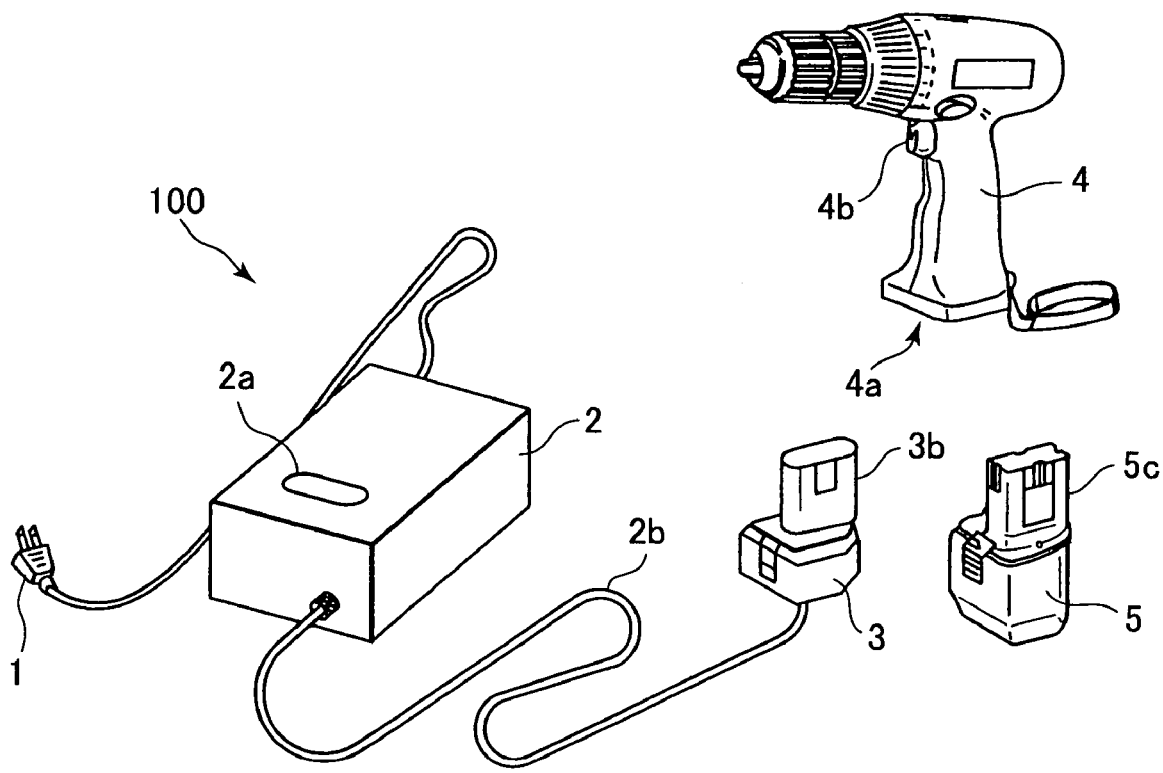
FIG. 1 is a perspective view showing a DC power source unit with a charging function according to an embodiment of the present invention.

As shown in FIG. 1, a cordless power tool 4 is used with selective one of the DC power source unit 100 and a battery pack 5. The cordless power tool 4 includes a power switch 4b. The battery pack 5 includes an insertion portion 5c that is detachably mountable into a handgrip recess 4a of the cordless power tool 4.

The DC power source unit 100 includes an AC cord 1, a main unit 2, and an adapter 3. The AC cord 1 connects the main unit 2 to a commercial alternating current (AC) power source. Also, an output cable 2b connects the main unit 2 to the adapter 3. The adapter 3 includes an adapter plug 3b which has the same shape as the insertion portion 5c of the battery pack 5. The adapter plug 3b is inserted into the handgrip recess 4a of the cordless power tool 4 in order to supply power to the power tool 4. The main unit 2 has a battery pack insertion recess 2a with the same shape as the handgrip recess 4a of the power tool 4. The insertion portion 5c of the battery pack 5 is inserted into the battery pack insertion recess 2a in order to charge the battery pack 5 in a manner to be described later.

Figure 2A:
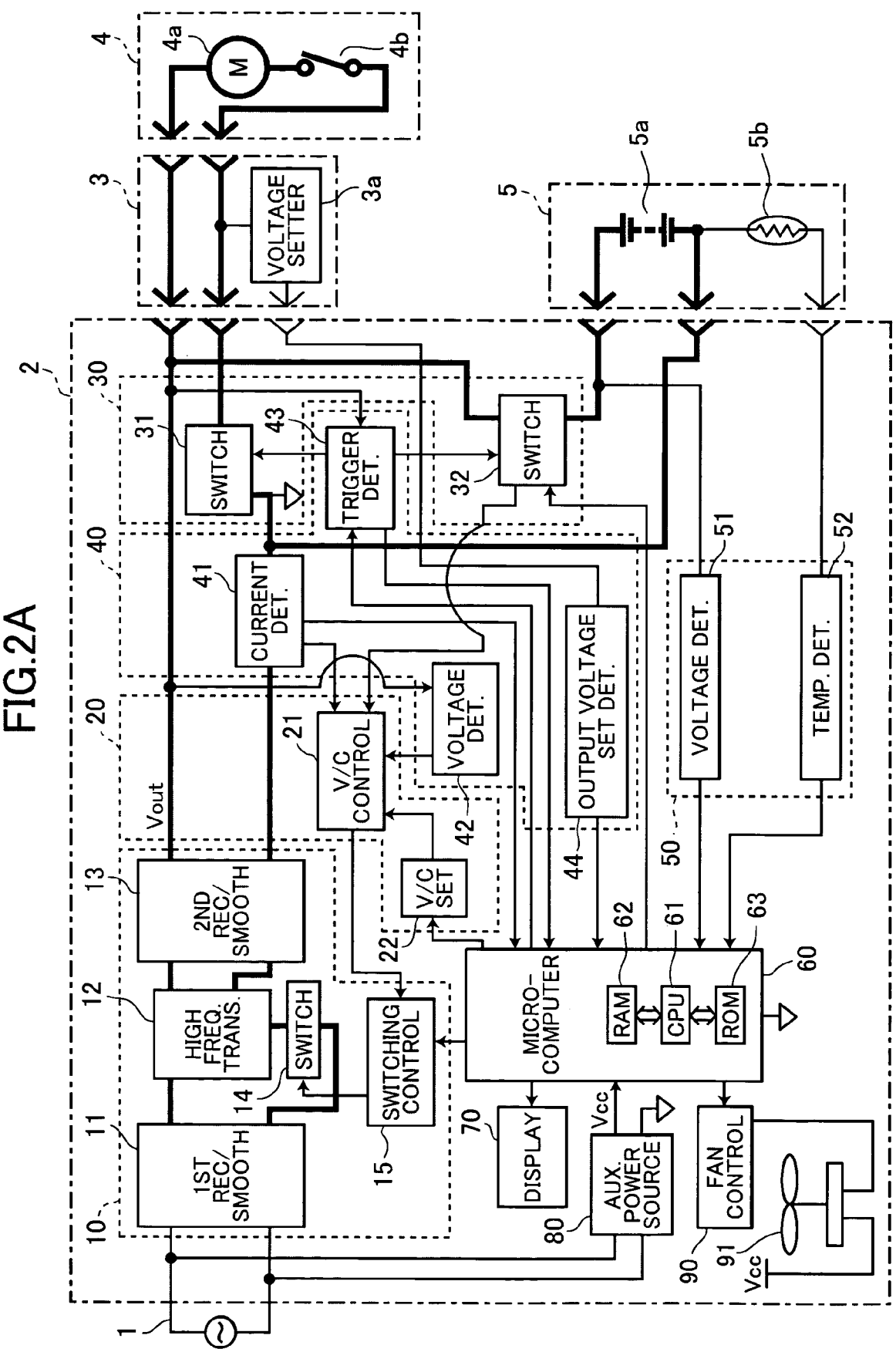
FIG. 2A is a block diagram showing an electrical arrangement of the DC power source unit according to a first embodiment of the invention.

As shown in FIG. 2A, the adapter 3 further includes an output voltage setter 3a for designating the voltage that corresponds to the rated voltage of the power tool 4 attached to the adapter 3. The power tool 4 includes a DC motor 4a connected in series with the power switch 4b. When the power switch 4b is turned ON, then DC power is supplied from the main unit 2 through the adapter 3 to the power tool 4.

The battery pack 5 further includes a chargeable battery 5a, and a temperature sensor 5b. The temperature sensor 5b is disposed adjacent to or in contact with the battery 5a. A thermistor is, for example, used as the temperature sensor 5b.

As shown in FIG. 2A, the main unit 2 includes a switching power source 10, a power source output controller 20, a power source output switcher 30, a power source output detector 40, a battery condition detector 50, a microcomputer 60, a display 70 and an auxiliary power source circuit 80.

The switching power source 10 includes a first rectifying and smoothing circuit 11, a high-frequency transformer 12, a second rectifying and smoothing circuit 13, a switching element 14, and a switching control circuit 15. The switching control circuit 15 adjusts output voltage and output current from the second rectifying and smoothing circuit 13 by changing width of the pulse applied to the switching element 14.

The power source output controller 20 includes a voltage/current control circuit 21 and a voltage/current setting circuit 22. The voltage/current setting circuit 22 sets the value of a drive voltage required for driving the connected power tool 4 and the value of a current required for charging a mounted battery pack 5. Based on signals from an output current detecting circuit 41 and a voltage detection circuit 42 of the power source output detector 40, the voltage/current control circuit 21 controls the switching power source 10 to adjust voltage and current of power output from the main unit 2 to match values set in the voltage/current setting circuit 22.

That is, while the power switch 4b is turned ON to drive the power tool 4, the voltage/current control circuit 21 receives a current signal from the output current detecting circuit 41 and a voltage signal from the voltage detection circuit 42 that indicate actual current and voltage, respectively, being supplied to the power tool 4. The voltage/current control circuit 21 feeds back these current and voltage signals to the switching control circuit 15 so that the switching control circuit 15 can control the switching duty of the switching element 14 in order to compensate for voltage drop across the cable 2b of the adapter 3 and thus maintain the voltage supplied to the power tool 4 to levels set in the voltage/current setting circuit 22.

On the other hand, while the power switch 4b is turned OFF and a battery pack 5 is mounted in the main unit 2 for charging, the voltage/current control circuit 21 receives the current signal from the output current detecting circuit 41 and feeds back to the switching control circuit 15. The switching control circuit 15 controls the switching duty of the switching element 14 to control charge current supplied to the battery pack 5. The switching control circuit 15 further controls the switching duty of the switching element 14 based on a signal from the battery condition detector 50.

The power source output switcher 30 includes a power source output switch circuit 31 and a charge output switch circuit 32. The power source output switch circuit 31 enables supply of power output to the power tool 4 when the power switch 4b is turned ON. The charge output switch circuit 32 enables charging of the battery pack 5 when the power tool 4 is not being used. The charge output switch circuit 32 is, for example, configured from a relay circuit as disclosed in U.S. Pat. No. 6,566,843 which is herein incorporated by reference.

The power source output detector 40 includes the output current detecting circuit 41, the voltage detection circuit 42, a trigger detection circuit 43, and an output voltage setting detection circuit 44. The output current detecting circuit 41 detects the charge current being supplied to the battery pack 5 while the power switch 4b is turned OFF, and outputs a current signal to the voltage/current control circuit 21 for the purpose of adjusting the current supplied to the battery pack 5 to the level set by the voltage/current setting circuit 22. The voltage detection circuit 42 detects the voltage output from the second rectifying and smoothing circuit 13 and outputs a signal to the voltage/current control circuit 21 for the purpose of supplying a constant voltage to the adapter 3. The trigger detection circuit 43 detects whether the power switch 4b is turned ON. When the trigger detection circuit 43 detects that the power switch 4b is turned ON, it instantaneously outputs a signal for disabling charging operations and a signal for enabling supply of power to the power tool 4. The output voltage setting detection circuit 44 detects the voltage value set by the output voltage setter 3a of the adapter 3.

The battery condition detector 50 includes a battery voltage detection circuit 51 and a battery temperature detection circuit 52. The battery voltage detection circuit 51 detects battery voltage of the chargeable battery 5a. The battery temperature detection circuit 52 detects battery temperature indicated by the temperature sensor 5b in the battery pack 5.

The microcomputer 60 includes a central processing unit (CPU) 61, a random access memory (RAM) 62, and a read-only memory (ROM) 63 and performs a variety of different functions in accordance with programs stored in the ROM 63. For example, the microcomputer 60 sets the drive voltage supplied to the power tool 4 based on output from the power source output detector 40 and, while the power tool 4 is not being used, sets the charge current that is supplied to the battery pack 5 based on output from the battery condition detector 50. The microcomputer 60 also determines whether battery charge can be performed based on output from the battery condition detector 50 and on whether the power tool 4 is in a condition of non-use, that is, whether the power switch 4b is turned OFF. When the microcomputer 60 determines that battery charge can be performed, the microcomputer 60 outputs a charge enabling signal to the charge output switch circuit 32 through the trigger detection circuit 43. Further, the microcomputer 60 computes a battery temperature gradient (hereinafter abbreviated to "BTG") dT/dt and a battery voltage gradient (hereinafter abbreviated to "BVG") dV/dt. The BTG is computed based on the newly detected battery temperature and an earlier detected battery temperature as will be described later. Similarly, the BVG is computed based on the newly detected battery voltage and an earlier detected battery voltage. The RAM 62 has storage locations for storing data regarding battery temperature, battery voltage, BTG, BVG, and BTG minimum value dT/dt(min) and for storing various flags to be described later.

The display circuit 70 is configured from an LED, for example, and displays a variety of information for the operator, such as, that the power tool 4 is being used or is in a usable condition, or that the battery pack 5 is being charged. The auxiliary power source circuit 80 supplies a positive supply voltage Vcc to the power source of the microcomputer 60, and to the power source output controller 20, the power source output detector 40, the battery condition detector 50, and the like.

The main unit 2 further includes a cooling fan controller 90 and a cooling fan 91. The cooling fan controller 90 is connected to the microcomputer 60 and controls ON/OFF switching of the cooling fan 91 in accordance with a command from the microcomputer 60. The cooling fan 91 is used to forcibly cool the battery pack 5 during charging, so is disposed near the insertion recess 2a of the main unit 2.

Figure 3A:
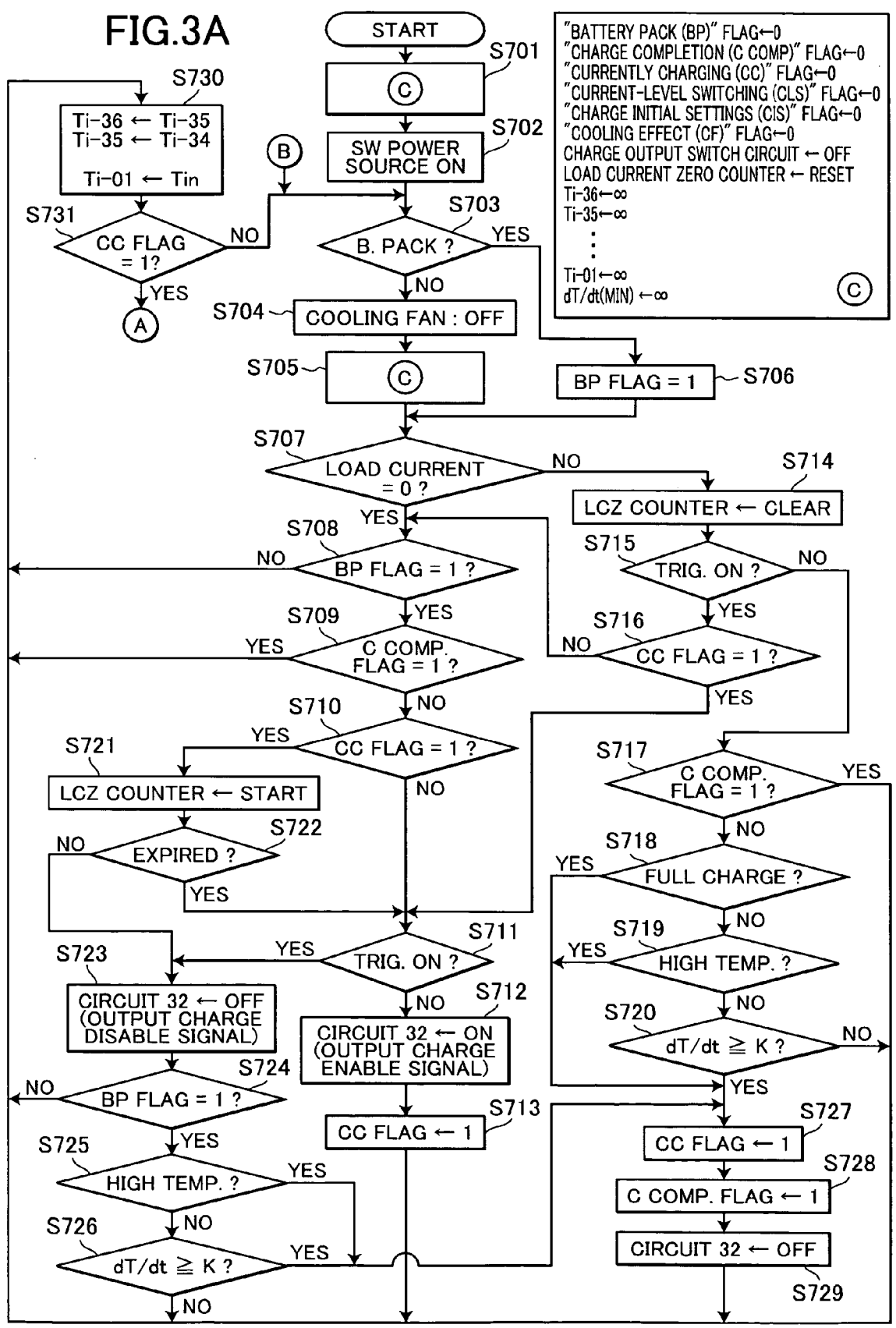
FIG. 3A is a part of a flowchart illustrating operations of the DC power source unit according to the first embodiment of the invention.
Figure 3B:
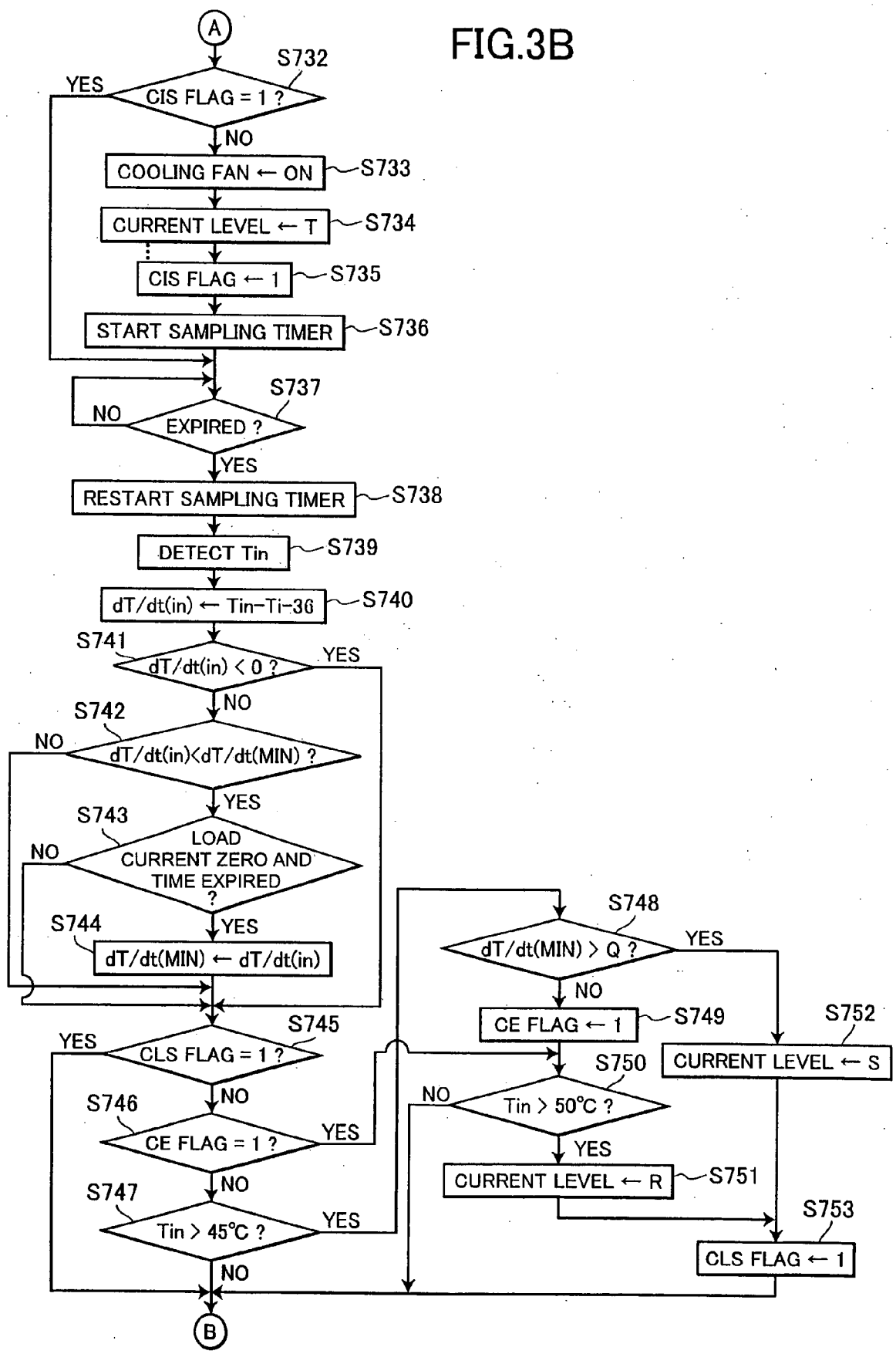
FIG. 3B is a remaining part of the flowchart according to the first embodiment of the invention.
Figure 4A:
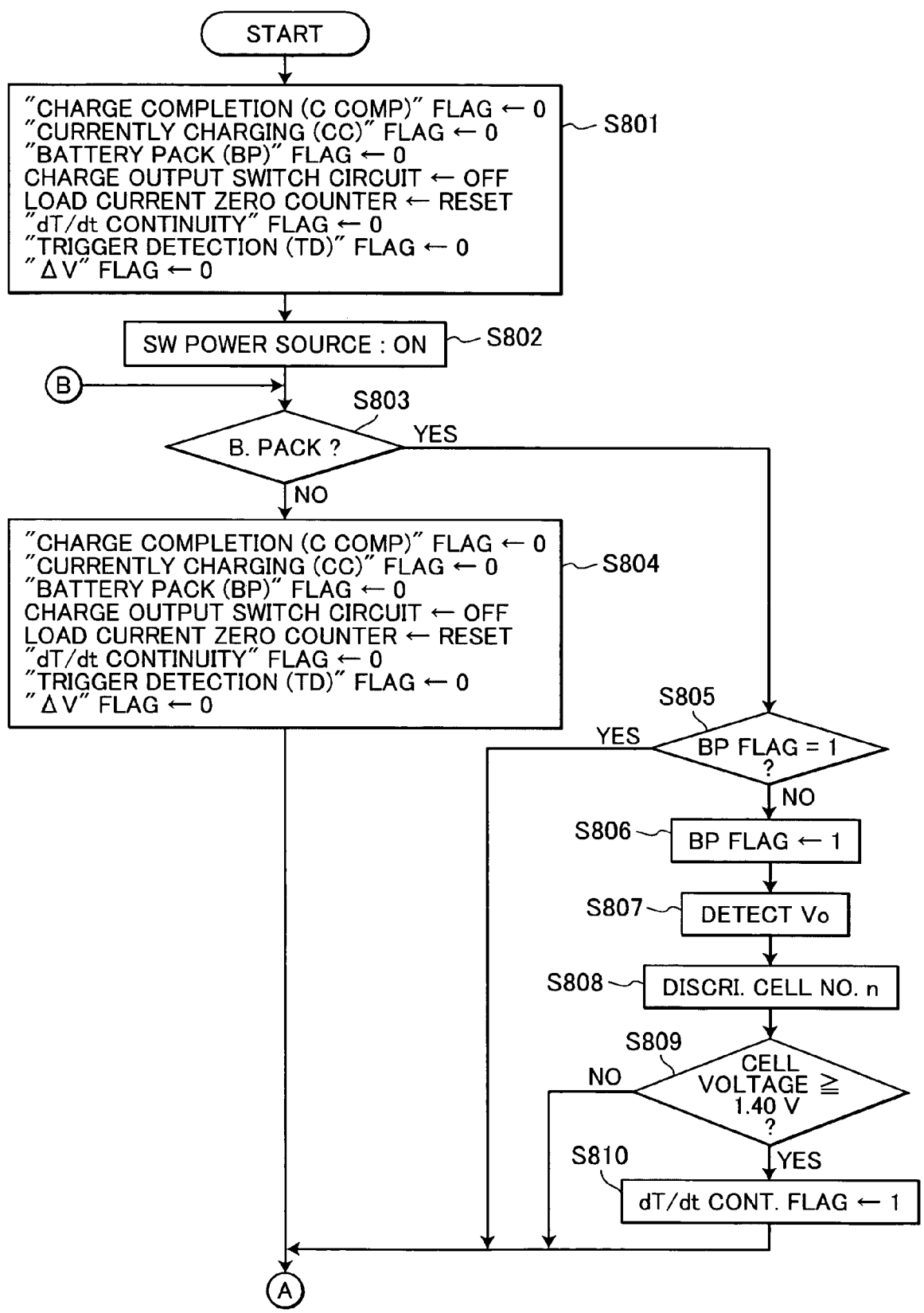
FIG. 4A is a first part of a flowchart illustrating operations of the DC power source unit according to the second embodiment of the invention.
Figure 4B:
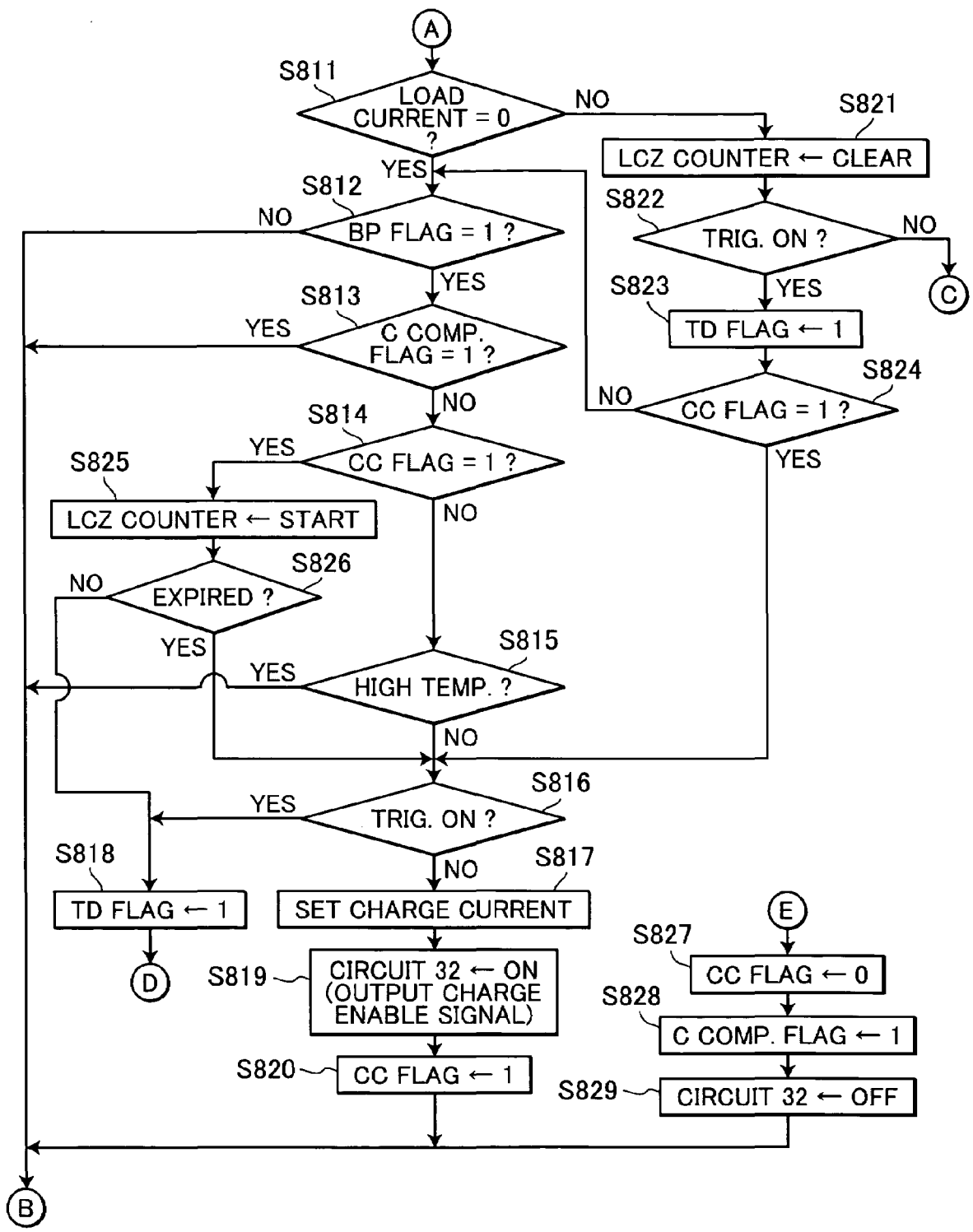
FIG. 4B is a second part of a flowchart illustrating operations of the DC power source unit according to the second embodiment of the invention.
Figure 4C:
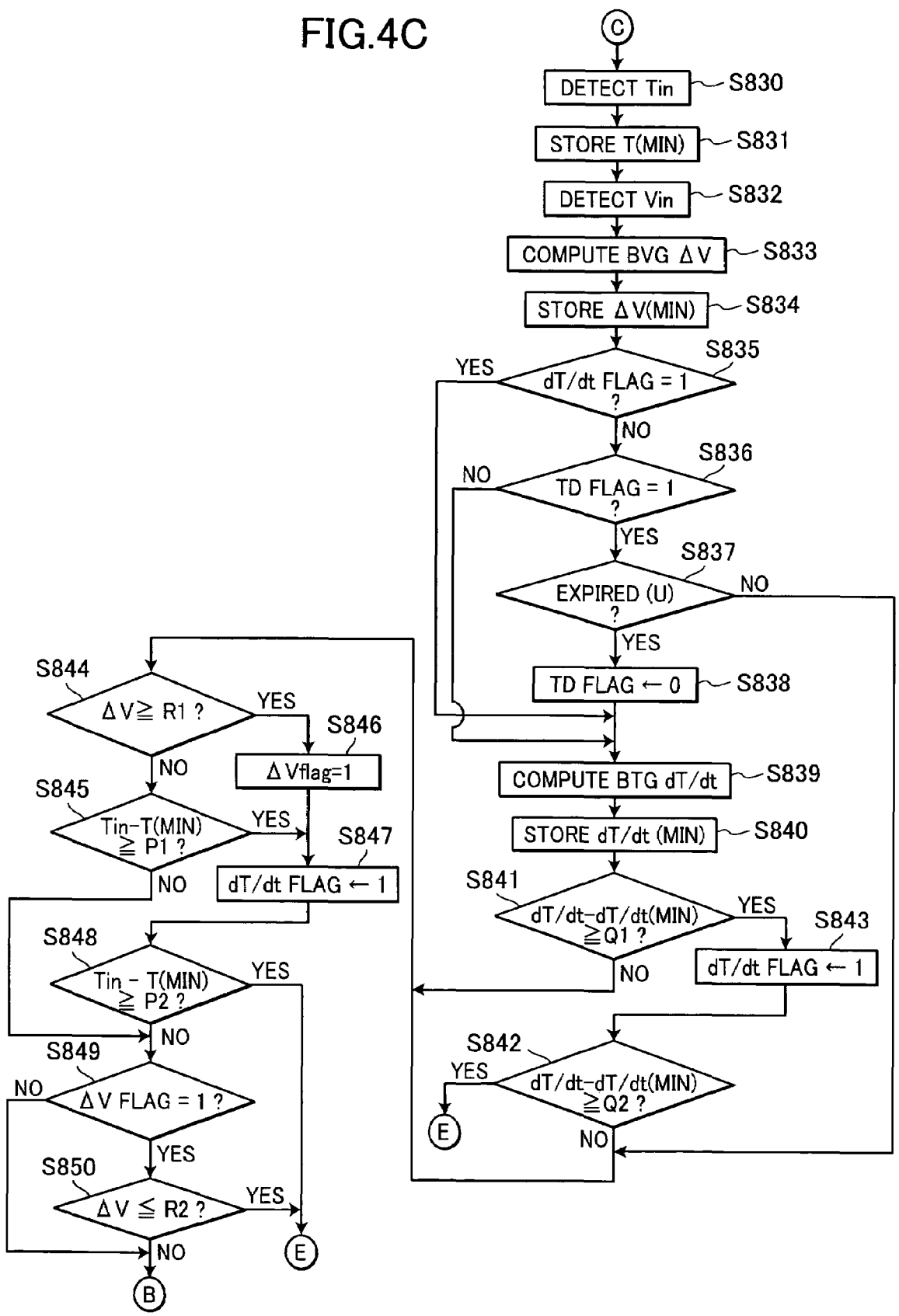
FIG. 4C is a third part of a flowchart illustrating operations of the DC power source unit according to the second embodiment of the invention.
Figure 4D:
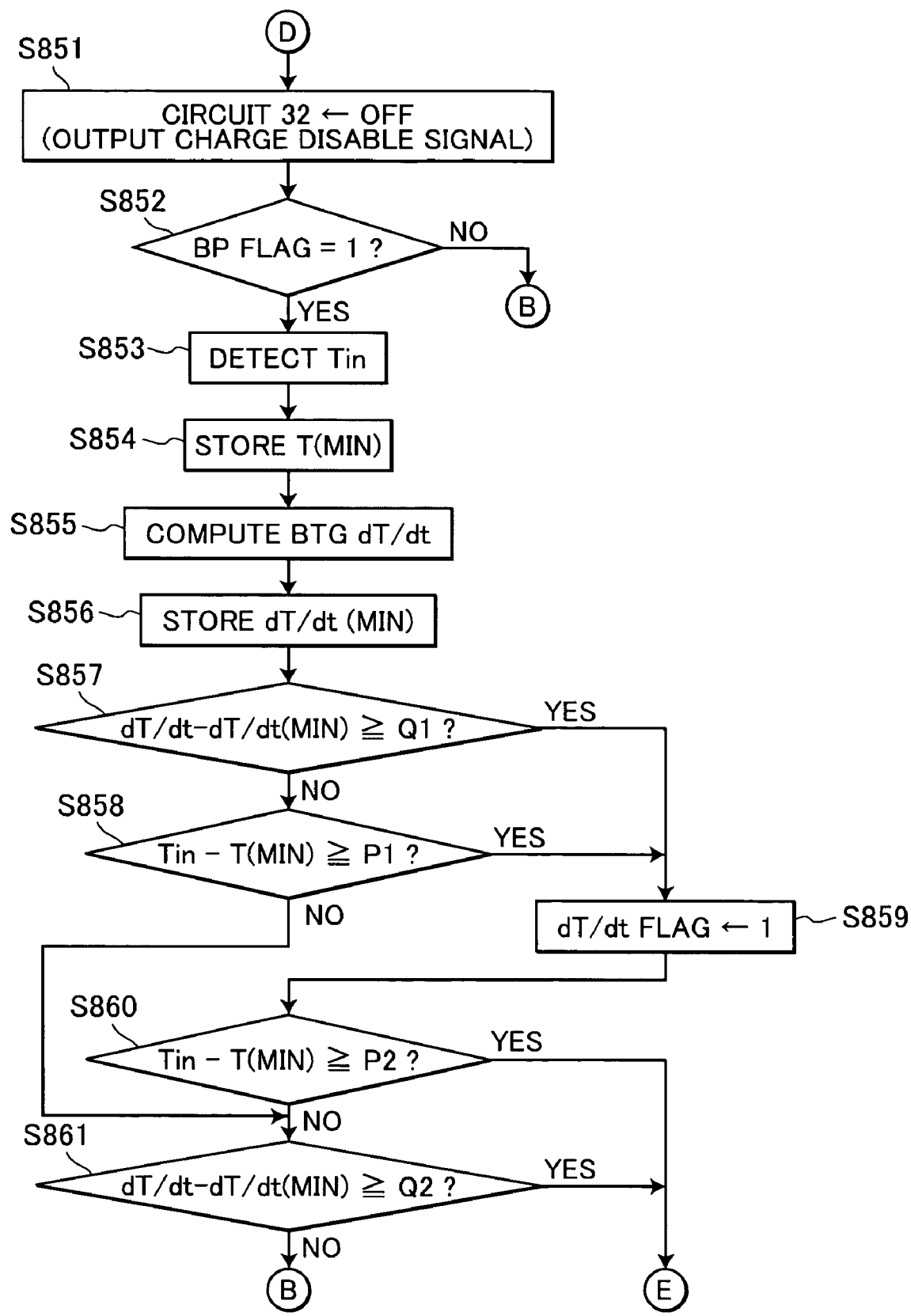
FIG. 4D is a third part of a flowchart illustrating operations of the DC power source unit according to the second embodiment of the invention.

Next, operation of the DC power source unit 100 according to the first embodiment will be described while referring to the flowchart shown in FIGS. 3A and 3B and explanatory diagrams shown in FIGS. 5A through 5D.

When the AC cord 1 is connected to a commercial 100 V AC power source, the microcomputer 60 and other components, such as the power source output controller 20, are supplied with the positive supply voltage Vcc from the auxiliary power source circuit 80.

In step 701, the microcomputer 60 performs various initial settings. Specifically, various flags stored in the RAM 62 are reset. The flags stored in the RAM 62 includes a "battery pack" flag, a "charge completion" flag, a "currently charging" flag, a "current-level switching" flag, a "charge initial settings" flag, and a "cooling effect" flag. The "battery pack" flag indicates that when the flag is set or changed to "1", the battery pack 5 is inserted into the battery pack insertion recess 2a of the main unit 2. The "charge completion" flag indicates that when the flag is set or changed to "1", charging the battery pack 5 is complete. The "currently charging" flag indicates that when the flag is set or changed to "1", the battery pack 5 is in the progress of charging. The "current-level switching" flag indicates when the flag is set or changed to "1", switching of the charging current level is ended. The "charge initial settings" flag indicates that when the flag is set or changed to "1", the initial settings needed for charging the battery pack 5 is ended. The "cooling effect" flag indicates that when the flag is set or changed to "1", the type of the battery pack 5 is suitable for cooling during charging.

Also, in the initial settings, battery temperature data Ti-36, Ti-35, . . . , Ti-01 and a BTG minimum value dT/dt(min) both stored in the RAM 62 are reset and the charge output switch circuit 32 is turned OFF (step 701). It should be noted that the battery temperature is sampled at a predetermined time interval, and the battery temperature sampled is converted, for example, by an 8-bit A/D converter (not shown) provided in the microcomputer 60 to a digital value ranging from 0 to 255 in decimal notation. Thirty-six (36) digital values Ti-36, Ti-35, . . . , Ti-01 obtained at the most recent thirty-six sampling times are accumulated in the RAM 62. With the initial settings, each of the thirty-six digital values Ti-36, Ti-35, . . . , Ti-01 is rewritten to the maximum digital value, i.e., 255 in the above-described example. The BTG value dT/dt is computed each time the battery temperature is sampled using the newly obtained data Ti-01 and the oldest data Ti-36, and the thus computed BTG value is stored as a BTG minimum value dT/dt(min) if it is minimum amongst the ever computed BTG values. If the newly computed BTG value is not minimum, the BTG minimum value stored in the RAM 62 is not updated.

In addition to the above initial settings, the microcomputer 60 outputs a signal for turning OFF the charge output switch circuit 32 of the power source output switcher 30, and resets the load current zero (LCZ) counter (not shown) incorporated in the microcomputer 60.

Next, the microcomputer 60 outputs a signal to the switching control circuit 15, thereby causing the switching power source 10 to operate (step 702). In this condition, when the power switch 4b of the power tool 4 is turned ON, then the trigger detection circuit 43 of the power source output detector 40 turns ON the power source output switch circuit 31 of the power source output switcher 30 so that a drive voltage that corresponds to the rated voltage of the presently-connected power tool 4 is supplied from the power source output switcher 30 to the power tool 4 via the adapter 3.

Next, the microcomputer 60 judges whether the battery pack 5 is inserted into the battery pack insertion recess 2a of the main unit 2 based on outputs from the battery voltage detection circuit 51 and the battery temperature detection circuit 52 of the battery condition detector 50 (step 703). If the battery pack 5 is inserted into the insertion recess 2a (step 703:YES), then the microcomputer 60 sets the "battery pack" flag (BP FLAG=1:step 706) and the routine proceeds to step 707. On the other hand, when the battery pack 5 is not inserted into the insertion recess 2a (step 703:NO), then the microcomputer 60 deactivates the cooling fan 91 (step 704) and performs the initial settings same as those performed in step 701 (step 705).

Next, the microcomputer 60 determines whether the power switch 4b has been turned OFF by detecting the output from the output current detecting circuit 41 to judge whether the load current is zero (step 707). When the load current is determined to be zero (step 707:YES), judgement is made to determine whether or not the "battery pack" flag is set ("BP FLAG=1?":step 708). When the "battery pack" flag is not set (step 708:NO), the routine proceeds to step 730. On the other hand, when the "battery pack" flag is set (step 708:YES), the microcomputer 60 judges whether the battery pack 5 is in a charge completion state based on the indication of the "charge completion" flag ("CCOMP FLAG=1?":step 709). When the battery pack 5 is in the charge completion state (step 709: YES), i.e., when the "charge completion" flag is set, then routine proceeds to step 730.

When the battery pack 5 is not in the charge completion state (step 709: NO), i.e., when the "charge completion" flag is not set, then the microcomputer 60 judges whether or not the battery pack 5 is currently being charged based on the indication of the "currently charging" flag ("CC FLG=1?": step 710). If the battery pack 5 is not being charged (step 710: NO), then the microcomputer 60 judges whether the power switch 4b is turned ON based on the output from the trigger detection circuit 43 ("TRIG. ON?":step 711). When the power switch 4b is not turned ON (step 711:NO), then the microcomputer 60 outputs a charge enable signal to the charge output switch circuit 32 (step 712). The microcomputer 60 turns OFF the power source output switch circuit 31 via the trigger detection circuit 43, turns ON the charge output switch circuit 32 to start charging operations, and sets the "currently charging" flag ("CC FLAG ←1":step 713), whereupon the routine proceeds to step 730.

When the result of judgement in step 707 indicates that the load current is not zero (step 707:NO), the microcomputer 60 clears the load current zero (LCZ) counter (step 714). Then, the microcomputer 60 monitors whether the power switch 4b is turned ON based on the output from the trigger detection circuit 43 ("TRIG. ON?":step 715). When the power switch 4b is turned ON (step 715:YES), the microcomputer 60 judges whether or not the "currently charging" flag is set ("CC FLAG=1?":step 716). When the "currently charging flag" is set (step 716:YES), the routine proceeds to step 711. On the other hand, when the "currently charging" flag is not set (step 716:NO), the routine returns to step 708.

When the result of judgement in step 715 indicates that the power switch 4b is not turned ON (step 715:NO), the routine proceeds to step 717 where judgement is made as to whether or not the "charge completion" flag is set ("CCOMP FLAG=1?"). When the "charge completion" flag is set (step 717:YES), the routine proceeds to step 730. On the other hand, when the "charge completion" flag is not set (step 717:NO), the microcomputer 60 judges whether or not the battery pack 5 has reached the full charge condition through detection of the battery voltage by the battery voltage detection circuit 51 (step 718).

The full charge condition of the battery can be detected by a so-called −ΔV detection method, a second order differential detection method, or other methods known in the art. In the −ΔV detection method, charging the battery is stopped as being reached to the full charge condition when a predetermined voltage drop (−ΔV) is detected after the battery voltage reaches the peak. The second order differential detection method uses a second order differential of the battery voltage differentiated by time. When the second order differential of the battery voltage becomes negative, it is determined that the battery voltage has reached the peak, thus charging the battery is stopped.

When the result of judgement in step 718 indicates that the battery pack 5 has reached the full charge condition (step 718:YES), the microcomputer 60 sets the "currently charging" flag ("CC FLGA←1":step 727), sets the "charge completion" flag ("CC FLAG←1":step 728), and turns the charge output switch circuit 32 OFF (step 729), whereupon the routine proceeds to step 730.

When the result of judgement in step 718 indicates that the battery pack 5 has not yet reached the full charge condition (step 718:NO), the microcomputer 60 judges whether or not charging the battery pack 5 can be continued in terms of the temperature of the battery pack 5 (step 719). Specifically, when the output of the battery temperature detection circuit 52 indicates that the temperature of the battery pack 5 is so high that charging the battery pack 5 should not be continued (step 719:YES), then the microcomputer 60 executes the processes in steps 727, 728 and 729, whereupon the routine proceeds to step 730. On the other hand, when the output of the battery temperature detection circuit 52 indicates that the temperature of the battery pack 5 is not so high as to stop charging (step 719:NO), the microcomputer 60 judges whether or not the battery pack 5 has reached the full charge condition according to a well known dT/dt detection method (step 720). In the dT/dt detection method, a battery is determined to be fully charged when the BTG has reached or exceed a predetermined value K.

To this end, the output of the battery temperature detection circuit 52 is sampled at every sampling time and converted to a digital value. As described previously, thirty six digital values Ti-36, Ti-35, . . . , Ti-01, which indicate the battery temperatures sampled in the most recent thirty six sampling times, are accumulated in the RAM 62 of the microcomputer 60 and are updated each time the battery temperature is newly detected. The BTG is computed by subtracting the oldest digital value Ti-36 from the newest digital value Ti-01 where the time between detection of the battery temperature corresponding to the oldest digital value Ti-36 and detection of the current battery temperature corresponding to the digital value Ti-01 is fixed, i.e., a time corresponding to thirty five sampling intervals. The BTG is computed whenever the battery temperature is newly detected.

When the newly computed BTG is below the predetermined value K (step 720:NO), the routine proceeds to step 730. On the other hand, when the newly computed BTG is equal to or greater than the predetermined value K (step 720:YES), the battery pack 5 is determined to be full charge and the processes in steps 727, 728 and 729 are executed.

When the result of judgement in step 710 indicates that the "currently charging" flag is set, i.e., when the battery pack 5 is being charged (step 710:YES), the microcomputer 60 starts the load current zero (LCZ) counter (step 721) and judges whether or not the load current zero condition has continued for a predetermined period of time (step 722). It should be noted that the process in step 721 may be executed after the power switch 4b was turned ON (step 715:YES). In such a situation, the load current zero counter starts measuring the load current zero condition after the power switch 4b is turned OFF. Because charging the battery pack 5 is interrupted due to the operation of the power tool 4, the microcomputer 60 checks if the non-use condition of the power tool 4 has been continued for the predetermined period of time in step 722.

When the result of judgement in step 722 indicates that the predetermined period of time has expired (step 722: YES), the routine proceeds to step 711 in order to resume charging the battery pack 5. The predetermined period of time to be checked in step 722 is, for example, one minute. This time duration should be set depending on the sampling interval of the battery voltage and/or battery temperature and also the circumstance in which the power tool 4 is used.

When the result of judgement in step 722 indicates that the load current zero condition has not yet been continued for more then the predetermined period of time (step 722: NO), the microcomputer 60 outputs a charge disable signal to the charge output switch circuit 32 (step 723). Next, the microcomputer 60 judges whether or not the "battery pack" flag is set ("BP FLAG=1?":step 724). When the "battery pack" flag is not set (step 724:NO), the routine proceeds to step 730 whereas when the "battery pack" flag is set (step 724:YES), the microcomputer 60 judges whether or not the battery pack 5 is high in temperature based on the output from the battery temperature detection circuit 52 (step 725). Detection of the battery pack's temperature is performed to determine if the battery pack 5 has reached the full charge condition even if the power switch 4b is once turned ON during charging and thus the battery pack 5 is actually not been charged. When the battery pack 5 is high temperature (step 725:YES), the microcomputer 60 sets the "currently charging" flag and the "charge completion" flag (steps 727 and 728) and further turns OFF the charge output switch circuit 32 (step 729).

When the result of judgement in step 725 indicates that the battery pack 5 is not high temperature (step 725:NO), then the microcomputer 60 judges whether or not the battery pack 5 has reached the full charge condition according to the dT/dt detection method (step 726). When the BTG is below the predetermined value K indicating that the battery pack 5 has not yet reached the full charge condition, the routine proceeds to step 730. On the other hand, when the BTG is equal to or greater than the predetermined value K indicating that the battery pack 5 has reached the full charge condition, the microcomputer 60 sets the "currently charging" flag and the "charge completion" flag (steps 727 and 728) and further turns OFF the charge output switch circuit 32 (step 729).

In step 730, ever stored thirty six digital values Ti-36, Ti-35, . . . , Ti-01, which indicates the temperature of the battery pack 5 detected at the most recent thirty six sampling times, are shifted one by one to be restored in the shifted storage positions while introducing the newest digital value (Tin) and expelling the oldest digital value. Next, the microcomputer 60 judges whether or not the "currently charging" flag is set ("CC FLAG=1?":step 731). When the flag is not set (step 731:NO), the routine returns to step 703. On the other hand, when the "currently charging" flag is set (step 731:YES), the microcomputer 60 judges whether or not the "charge initial settings" flag is set ("CIS FLAG=1?":step 732). If the flag is set (step 732:YES), the routine jumps to step 737. On the other hand, when the "charge initial settings" flag is not set (step 732:NO), this indicates that the initial settings for charging the battery back 5 have not yet been accomplished. Accordingly, the microcomputer 60 activates the cooling fan 91 through the cooling fan control circuit 90 (step 733). Further, in order to maintain the charge current to a level T, the microcomputer 60 outputs a signal to the voltage/current setting circuit 22 (step 734). This completes the initial settings for charging the battery pack 5.

Accordingly, the microcomputer 60 sets the "charge initial settings" flag ("CIS FLAG←1":step 735) and starts a sampling timer (not shown) incorporated in the microcomputer 60 (step 736).

Next, the microcomputer 60 judges whether or not duration of time corresponding to a sampling interval has expired (step 737). When the measuring time is up (step 737:YES), the sampling timer is restarted to measure the same duration of time (step 738). The microcomputer 60 then detects the current battery temperature Tin based on the output from the battery temperature detection circuit 52 (step 739) and computes the BTG dT/dt(in) based on the newly detected battery temperature Tin and the oldest battery temperature Ti-36 (step 740). The microcomputer 60 judges whether or not the BTG dT/dt(in) is a negative value (step 741). When the BTG dT/dt(in) is a negative value (step 741:YES), the routine jumps to step 745. In this situation, duration of time corresponding to thirty six sampling intervals has not yet been expired. It should be noted that at the time of initial settings performed in steps 701 and 705, the maximum digital value is set to Ti-36, so that the computed BTG dT/dt(in) results in a negative value up to the time when initial thirty six samplings are performed. When the result of judgement in step 741 indicates that the BTG is not a negative value (step 741:NO), the microcomputer 60 judges whether or not the BTG minimum value dT/dt(min) stored in the RAM 62 is greater than the current BTG dT/dt(in) (step 742).

When the BTG minimum value dT/dt(min) is smaller than the current BTG dT/dt(in) (step 742:NO), the ETG minimum value dT/dt(min) is not updated and the routine jumps to step 745. On the other hand, when the BTG minimum value dT/dt(min) is greater than the current BTG dT/dt(in) (step 742:YES), the microcomputer 60 judges whether the load current is zero and whether or not a predetermined period of time U has been expired from detection of the zero-level of the load current (step 743). If the judgement made in step 743 is negative (step 743:NO), the microcomputer 60 does not update the BTG minimum value dT/dt (min) and executes the process of step 745. This situation indicates that charging the battery pack 5 is interrupted due to the operation of the power tool 4, resulting in lowering the BTG. If under this condition, the BTG minimum value dT/dt(min) is updated, the battery pack 5 with no cooling effect is liable to be judged to be the one with cooling effect. Therefore, when the result of judgement in step 743 indicates that the load current is not zero and the predetermined period of time U has not yet been expired from detection of the zero-level of the load current (step 743:NO), then the microcomputer 60 does not update the BTG minimum value dT/dt(min). On the other hand, when the result of judgement in step 743 indicates that the load current is zero and the predetermined period of time U has been expired from detection of the zero-level of the load current (step 743: YES), then the microcomputer 60 proceeds to step 744 where the BTG minimum value dT/dt(min) is updated.

Next, the microcomputer 60 judges whether or not the "current-level switching" flag is set ("CLS FLAG=1?":step 745). When the flag is set (step 745:YES), the routine returns to step 703 whereas when the flag is not set (step 745:NO), the microcomputer 60 judges whether or not the "cooling effect" flag is set ("CE FLAG=1?":step 746). When the flag is set (step 746:YES), the routine jumps to step 750 whereas when the flag is not set (step 746:NO), the microcomputer 60 judges whether or not the current battery temperature Tin is equal to or above 45 centigrade (step 747). When the current battery temperature Tin is equal to or lower than 45 centigrade (step 747:NO), the routine returns to step 703. On the other hand, when the current battery temperature Tin is above 45 centigrade (step 747:YES), the microcomputer 60 judges whether or not the BTG minimum value dT/dt(min) is greater than a predetermined value Q (step 748). When the judgement in step 748 is affirmative (step 748:YES), the battery pack 5 is judged to be with no cooling effect. In this case, the microcomputer 60 outputs a signal to the voltage/current setting circuit 22 so as to set the charge current to a level S lower than the level T (step 752). Charging the battery pack with no cooling effect with the charge current S results in less generation of heat from the battery pack 5 during charging. Following step 752, the microcomputer 60 sets the "current-level switching" flag ("CLS FLAG←1": step 753), whereupon the routine returns to step 703.

When the result of judgement in step 748 indicates that the BTG minimum value dT/dt(min) is less than a critical value Q (step 748:NO), the battery pack 5 is judged to be with cooling effect. Therefore, the microcomputer 60 sets the "cooling effect" flag ("CE FLAG←1":step 749). Next, the microcomputer 60 judges whether or not the current battery temperature Tin is above 50 centigrade (step 750). When the current battery temperature Tin is above 50 centigrade (step 750:YES), the microcomputer 60 outputs a signal to the voltage/current setting circuit 22 so as to set the charge current to a level R lower than the level T but higher than the level S (step 751). Charging the battery pack with cooling effect with the charge current R results in less generation of heat from the battery pack during charging. Following step 751, the microcomputer 60 sets the "current-level switching" flag (step 753), whereupon the routine returns to step 703.

Figure 5A:
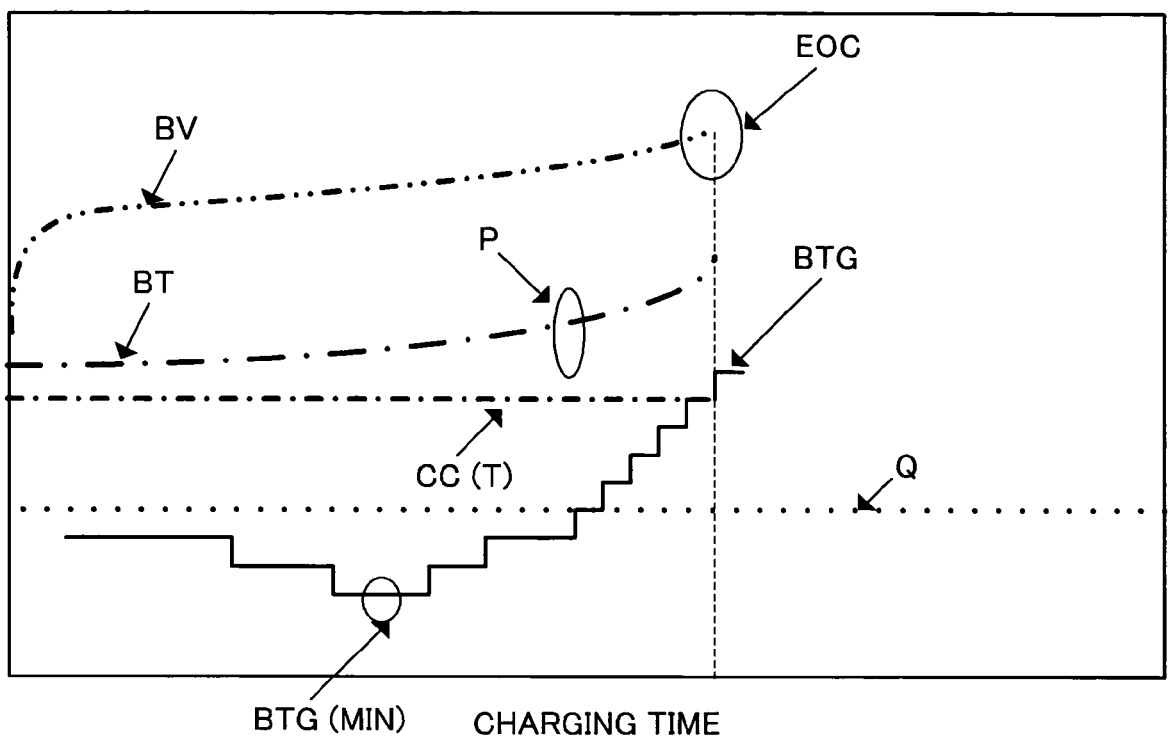
FIG. 5A is a graphical representation of a battery voltage (BV), a battery temperature (BT), a charge current (CC), and a battery temperature gradient (BTG) showing a principle of determining a cooling effect on a battery pack.

As described above, when the battery temperature Tin is above 45 centigrade (step 747:YES), whether or not the battery pack 5 being charged has a cooling effect is determined by comparing the BTG minimum value dT/dt(min) with the critical value Q. FIG. 5A shows that the battery voltage (BV) and battery temperature (BT) increases as the charging time elapses. The BTG, which is an analog-to-digital converted value, changes as shown. When the battery temperature has reached a temperature P (in the above-described embodiment, the temperature P is set to 45 centigrade), determination is made as to whether or not the BTG minimum value has exceeded the critical value Q. When the BTG minimum value has exceeded the critical value Q, then the battery pack 5 is determined to be with no cooling effect. On the other hand, when the BTG minimum value has not exceeded the critical value Q, then the battery pack 5 is determined to be with cooling effect. In the former case, as shown in FIG. 5B, the charge current (CC) is lowered from level T to level S. In the latter case, as shown in FIG. 5A, the charge current (CC) is not lowered and charging the battery pack 5 is continued up to the end of charge (EOC) with the charge current (CC) having a level T (step 734) if the battery temperature is not abnormally high.

When the power tool 4 is used during charging of the battery pack 5, the BTG lowers and records the minimum value during the use of tool (UOT) as shown in FIG. 5C. After charging the battery pack 5 is resumed, the battery pack 5 will soon reach the temperature P. At this point, the BTG(min) is still below the critical value Q. Both the battery packs with cooling effect and without cooling effect generally exhibit the characteristics shown in FIG. 5C. In the first embodiment described above, as can be easily understood from the diagram of FIG. 5D, a non-updating interval (NUI) of the BTG minimum value is set after the use of tool (UOT) is detected. In the flowchart of FIG. 3B, even if the computed BTG is found to be smaller than the ever recorded minimum value dT/dt(min), the BTG minimum value is not updated until a predetermined period of time U (NUI=U) has expired from the detection of the load current, i.e., UOT. With such a control, the earlier BTG minimum value detected before UOT is above the critical value Q when the battery temperature (BT) has reached the temperature P, so that battery pack 5 is determined to be with no cooling effect (step 748:YES). Accordingly, the charge current (CC) is lowered to level S as indicated in FIG. 5D and step 752 in the flowchart of FIG. 3B.

Figure 2B:
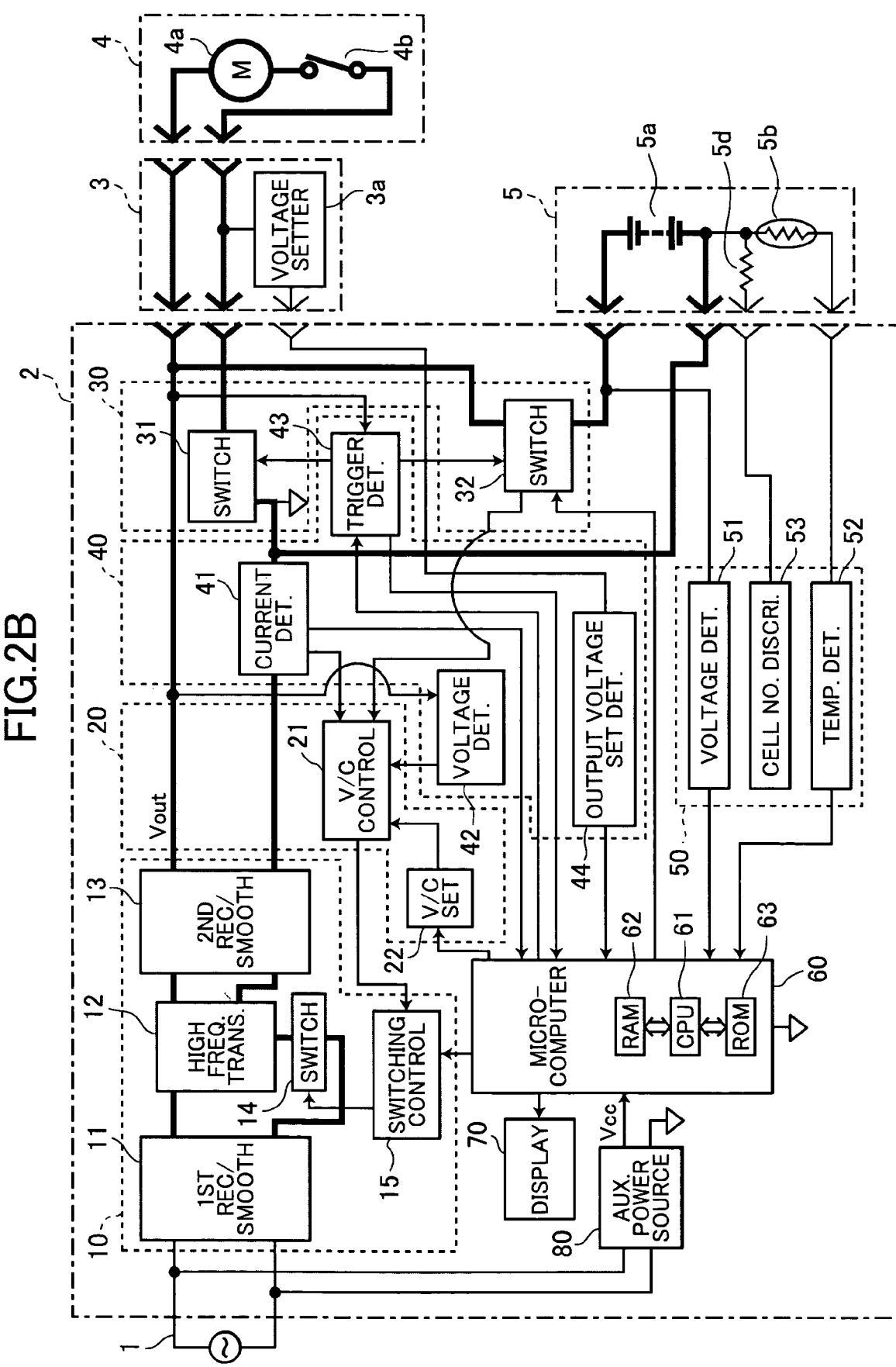
FIG. 2B is a block diagram showing an electrical arrangement of the DC power source unit according to a second embodiment of the invention.

A direct current (DC) power source unit 100 according to a second embodiment of the present invention will be described while referring to FIGS. 1, 2B, 4A–4D, and 6A–6G. According to the second embodiment, the DC power source unit 100 and the battery pack 5 shown in FIG. 1 are configured as shown in FIG. 2B. The electrical arrangements of the DC power source unit 100 and the battery pack 5 are basically the same as those of the first embodiment shown in FIG. 2A. The same circuits and the same components as those in FIG. 2A are designated by the same reference numerals in FIG. 2B, and duplicate description thereof is omitted herein.

The arrangement of FIG. 2B differs from that of FIG. 2A in that a cell number discriminating circuit 53 is provided in the battery condition detector 50 of the main unit 2, and a cell number identifying resistor 5d is incorporated in the battery pack 5. The battery pack 5 includes a chargeable battery 5a consisting of a plurality of cells connected in series. Different type of battery pack accommodates different number of cells. The resistor 5d has a specific resistance value corresponding to the number of cells. Therefore, the number of cells, i.e., the rated voltage of the battery pack 5, can be identified by the resistance value of the resistor 5d. When the insertion portion 5c of the battery pack 5 is inserted into the battery pack insertion recess 2a, the resistor 5d is brought into contact with the cell number discriminating circuit 53. The arrangement of FIG. 2B further differs from that of FIG. 2A in that the cooling fan 91 and its associated control circuit 90 are dispensed with. This means that in the second embodiment, the battery pack 5 is not forcibly cooled during charging. However, the cooling fan 91 and the cooling fan control circuit 90 may also be provided in the arrangement of FIG. 2B if a battery pack 5 that can be effectively cooled is intended to be used.

Next, operation of the DC power source unit 100 according to the second embodiment will be described while referring to the flowchart shown in FIGS. 4A through 4D and explanatory diagrams shown in FIGS. 6F and 6G. FIG. 6F is a graphical representation of a battery voltage (BV), a battery temperature (BT), and a charge current (CC) showing how a full charge condition is determined using a parameter of battery temperature. FIG. 6G is also a graphical representation of a battery voltage (BV), a battery temperature (BT), a charge current (CC), and a battery voltage gradient (BVG) showing how a near full charge condition and a full charge condition are determined using a parameter of BVG.

When the AC cord 1 is connected to a commercial 100V AC power source, the microcomputer 60 and other components, such as the power source output controller 20, are supplied with a positive supply voltage Vcc from the auxiliary power source circuit 80. The microcomputer 60 performs various initial settings, such as resetting a "charge completion" flag, a "currently charging" flag, a "battery pack" flag, a "dT/dt continuity" flag, a "trigger detection"

flag, and a "ΔV" flag (step 801). All these flags are store in the RAM 62 of the microcomputer 60.

In addition to resetting of the various flags, the microcomputer 60 outputs a signal for turning OFF the charge output switch circuit 32 of the power source output switcher 30, and resets the load current zero counter (not shown) incorporated in the microcomputer 60. The "dT/dt continuity" flag indicates that when the flag is set or changed to "1", computation of the BTG is carried out continuously when charging the battery pack 5 is resumed after the use of the cordless power tool is ended. The "trigger detection" flag indicates that when the flag is set or changed to "1", the power switch 4b is turned ON. The "ΔV" flag indicates that when the flag is set or changed to "1", the full charge condition of the battery pack 5 is detected based on the battery voltage.

Next, the microcomputer 60 outputs a signal to the switching control circuit 15, thereby causing the switching power source 10 to operate (step 802). In this condition, when the power switch 4b of the power tool 4 is turned ON, then the trigger detection circuit 43 of the power source output detector 40 turns ON the power source output switch circuit 31 of the power source output switcher 30 so that a drive voltage that corresponds to the rated voltage of the presently-connected cordless power tool 4 is supplied from the power source output switcher 30 to the power tool 4 via the adapter 3.

Next, the microcomputer 60 judges whether the battery pack 5 is inserted into the battery pack insertion recess 2a of the main unit 2 based on outputs from the battery voltage detection circuit 51 and the battery temperature detection circuit 52 of the battery condition detector 50 (step 803). If a battery pack 5 is inserted into the battery pack insertion recess 2a (step 803:YES), then the microcomputer 60 further judge whether the "battery pack (BP)" flag is set (step 805). When the "battery pack" flag is not set (step 805:NO), then the microcomputer 60 sets the "battery pack" flag (step 806). A pre-charge battery voltage V0 is next detected by the voltage detection circuit 42 to detect the voltage of the battery before the charging operation is performed (step 807). Then, the number of cells (n) making up the battery 5a is detected by the cell number detecting circuit 53 based on the output from the resistor 5d (step 808). The microcomputer 60 then judges whether or not each cell voltage exceeds 1.40 volts (step 809) based on the pre-charge battery voltage V0 detected in step 807 and the cell number n detected in step 808. If the cell voltage is above 1.40 volts (step 809: YES), the battery pack 5 is in a near full charge condition, that is, a great deal of capacity remains in the battery pack 5. The "dT/dt continuity" flag is therefore set (step 810) in order to continuously compute BTG dT/dt when the charging operation of the battery pack 5 is resumed after the use of the power tool 4 is ended. When the cell voltage is below 1.40 volts (step 809:NO), a sufficient amount of capacity does not remain in the battery pack 5. In this case, the routine proceeds to step 811.

If the battery pack 5 is not inserted into the battery pack insertion recess 2a (step 803:NO), then the microcomputer 60 resets the "charge completion" flag, the "currently charging" flag, the "battery pack" flag, the "dT/dt continuity" flag, the "trigger detection" flag, and the "ΔV" flag all stored in the RAM 62, and also resets the load current zero counter (step 804). Next, the microcomputer 60 determines whether or not the load current is zero (step 811) based on the output from the output current detecting circuit 41. The fact that the load current is zero means that the power switch 4b has been in OFF state.

When the load current is not flowing (step 811:YES), the microcomputer 60 judges whether or not the battery pack 5 is inserted into the battery pack insertion recess 2a based on the indication of the "battery pack (BP)" flag (step 812). When the battery pack 5 is not inserted into the recess 2a (step 812:NO), the routine returns to step 803. On the other hand, when the "battery pack" flag indicates that the battery pack 5 is inserted into the recess 2a (step 812: YES), then the microcomputer 60 judges whether the battery pack 5 is in a charge completion state based on the indication of the "charge completion (C COMP)" flag (step 813). If the "charge completion" flag indicates that the battery pack 5 is in the charge completion state (step 813: YES), the routine returns to step 803. On the other hand, when the battery pack 5 is not in the charge completion state (step 813: NO), the microcomputer 60 judges whether or not the battery pack 5 is in the progress of charging based on the indication of the "currently charging (CC)" flag (step 814). If the battery pack 5 is not being charged (step 814: NO), then the microcomputer 60 judges whether the temperature of the battery pack 5 is high or not by comparing the output from the battery temperature detection circuit 52 with a predetermined reference value (step 815). If the battery pack 5 is at a high temperature (step 815:YES), the routine returns to step 803.

On the other hand, when the battery pack 5 is not at a high temperature (step 815:NO), then the microcomputer 60 judges whether the power switch 4b is turned ON based on the output from the trigger detection circuit 43 (step 816). When the power switch 4b is not turned ON (step 816:NO), the microcomputer 60 outputs a signal to the voltage/current setting circuit 22 for setting the charge current to a predetermined level (step 817). Next, the microcomputer 60 outputs a charge enable signal to both the trigger detection circuit 43 and the charge output switch circuit 32 (step 819), thereby causing the trigger detection circuit 43 to turn OFF the power source output switch circuit 31 and to turn ON the charge output switch circuit 32. As a result, a charging operation is commenced. The microcomputer 60 then sets the "currently charging" flag (step 820), whereupon the routine returns to step 803.

When the result of judgement in step 811 indicates that the load current is flowing (step 811:NO), the microcomputer 60 clears the load current zero counter (step 821) and judges whether the power switch 4b is turned ON based on the output from the trigger detection circuit 43 (step 822). When the power switch 4b is turned ON (step 822:YES), then the microcomputer 60 sets the "trigger detection (TD)" flag (step 823) and judges whether or not the "currently charging" flag is set (step 824). When the "currently charging" flag is set (step 824:YES), the routine jumps to step 816 whereas when the "currently charging" flag is not set (step 824:NO), the routine returns to step 812.

When the power switch 4b is not turned ON (step 822: NO), the routine proceeds to step 830 where the microcomputer 60 implements data processing for determining that the battery pack 5 has reached the near full charge condition and that the battery has reached the full charge condition. To this end, the microcomputer 60 detects the temperature Tin of the battery pack 5 based on the output from the battery temperature detection circuit 52 and stores the detected data in the RAM 62 (step 830). Also, amongst the ever detected battery temperatures including the newly detected battery temperature Tin, a minimum battery temperature T(min) is stored (step 831). Then, the microcomputer 60 detects the current battery voltage Vin from the battery voltage detection circuit 51 and stores this data in the RAM 62 (step 832).

Further, the microcomputer 60 computes a battery voltage gradient (hereinafter abbreviated to "BVG") ΔV based on the newly detected battery voltage and the earlier detected battery voltage both detected by the battery voltage detection circuit 51 (step 833). Note that the earlier battery voltage used for computing the BVG ΔV is the one sampled a fixed duration of time ahead of the detection of the current battery voltage, similar to the computation of the BTG dT/dt. If the newly computed BVG is the smallest as compared with the ever computed BVGs, then BVG minimum value ΔV(min) is updated (step 834).

Next, the microcomputer 60 judges whether or not the "dT/dt continuity" flag is set (step 835). When the "dT/dt continuity" flag is set (step 835:YES), the routine jumps to step 839. On the other hand, when the "dT/dt continuity" flag is not set (step 835:NO), the microcomputer 60 judges whether or not the "trigger detection (TD)" flag is set (step 836). When the "trigger detection" flag is not set (step 836:NO), the routine jumps to step 839. On the other hand, when the "trigger detection" flag is set (step 836:YES), the microcomputer 60 judges whether or not a predetermined period of time U has expired after the charging operation is resumed (step 837). When the predetermined period of time U has not yet been expired after the charging operation is resumed (step 837:NO), the routine jumps to step 844 so that determination of the full charge condition of the battery pack 5 is not performed using the parameter of the BTG. When the predetermined period of time U has expired after the charging operation is resumed (step 837:YES), the "trigger detection" flag is reset (step 838).

Next, a BTG dT/dt is computed based on the newly detected battery temperature data and the earlier detected battery temperature data (step 839). By comparing the newly computed BTG dT/dt with the ever computed BTGS, a minimum value of the BTG dT/dt(min) is updated (step 840).

Next, the microcomputer 60 judges whether or not a difference between the BTG minimum value dT/dt(min) and the newly computed BTG dT/dt is equal to or greater than a predetermined value Q1 (step 841). That is, the microcomputer 60 judges whether the newly computed BTG dT/dt has exceeded the minimum value dT/dt(min) by the predetermined value Q1 or more. If the result of judgement is affirmative (step 841: YES), then the microcomputer 60 sets the "dT/dt continuity" flag (step 843) because in this condition, the microcomputer 60 determines that the battery pack 5 has reached a near full charge condition and the full charge condition follows shortly after the near full charge condition. After the "dT/dt continuity" flag is set, the routine proceeds to step 842. If the result of judgement in step 841 is negative (step 841: NO), then the routine jumps to step 844.

In step 842, the microcomputer 60 judges whether or not a difference between the newly computed BTG dT/dt and the BTG minimum value dT/dt(min) is equal to or greater than a predetermined value Q2 (step 842) where the predetermined value Q2 is greater than the predetermined value Q1 (Q2>Q1). That is, the microcomputer 60 judges whether the newly computed BTG dT/dt has exceeded the BTG minimum value dT/dt(min) by the predetermined value Q2 or more. If the result of judgement is affirmative (step 842: YES), the microcomputer 60 determines that the battery pack 5 has reached the full charge condition. Then, the microcomputer 60 resets the "currently charging (CC)" flag (step 827) and sets the "charge completion(C COMP)" flag (step 828). Further, the microcomputer 60 turns OFF the charge output switch circuit 32 (step 829) to thereby stop the charging operation, whereupon the routine again returns to step 803.

If the results of judgement in steps 841 and 842 are negative, then the microcomputer 60 judges whether or not the absolute value of BVG has reached or exceeded a predetermined value R1 (step 844) as depicted in FIG. 6G. If the result of judgement is affirmative (step 844: YES), the microcomputer 60 determines that the battery pack 5 has reached a near full charge condition and sets the ΔV flag stored in the RAM 62 (step 846). It should be noted that the battery voltage generally increases relatively abruptly and then decreases after reaching the peak when the battery is reaching the full charge state. As the full charge condition follows shortly after the near full charge condition, the microcomputer 60 sets the "dT/dt continuity" flag (step 847), and thereafter executes the process in step 848.

If the result of judgement in step 844 is negative (step 844: NO), then the microcomputer 60 judges whether or not a difference between newly detected battery temperature Tin and the battery temperature minimum value T(min) is equal to or greater than a predetermined value P1 (step 845) as depicted in FIG. 6F. That is, the microcomputer 60 judges whether the newly detected battery temperature Tin has exceeded the battery temperature minimum value T(min) by the predetermined value P1 or more. If the result of judgement in step 845 is affirmative (step 845: YES), the microcomputer 60 determines that the battery pack 5 has reached the near full charge condition. In this condition, the full charge condition follows shortly thereafter, so the microcomputer 60 sets the "dT/dt continuity" flag (step 847) and thereafter executes the process in step 848. When the result of judgement in step 845 is negative (step 845: NO), the routine jumps to step 849.

In step 848, the microcomputer 60 judges whether or not a difference between the newly detected battery temperature Tin and the battery temperature minimum value T(min) is equal to or greater than a predetermined value P2 as depicted in FIG. 6F, where the value P2 is greater than the value P1 (P2>P1). That is, the microcomputer 60 judges whether the newly detected battery temperature Tin has exceeded the battery temperature minimum value T(min) by the predetermined value P2 or more. If the result of judgement in step 848 is affirmative (step 848: YES), the microcomputer 60 determines that the battery pack 5 has reached the full charge condition. The microcomputer 60 further executes the processes in steps 827, 828 and 829 and stops the charging operation. If the result of judgement in step 848 is negative (step 848: NO), then the microcomputer 60 judges whether or not the ΔV flag is set (step 849). When the ΔV flag is not set (step 849:NO), the routine returns to step 803. When result of judgement in step 849 indicates that the ΔV flag is set (step 849: YES), the microcomputer 60 judges whether or not the newly computed BVG ΔV (absolute value) is equal to or less than a predetermined value R2 (step 850) where the value R2 is greater than the value R1 (R1>R2). When result of judgement in step 850 is affirmative (step 850: YES), the microcomputer determines that the battery pack 5 has reached the full charge condition. The microcomputer 60 then executes the processes in steps 827, 828 and 829 and stops the charging operation. When, on the other hand, the result of judgement in step 850 is negative (step 850: NO), the routine returns to step 803.

When the result of judgement in step 814 indicates that the battery pack 5 is in the progress of charging, that is, when the power switch 4b is once turned ON during charging the battery pack 5 and thereafter turned OFF, the load current zero counter is started (step 825). Then, the microcomputer 60 judges whether or not the load current zero condition is continued for a predetermined period of time (step 826). The load current zero condition indicates that the power tool 4 is being held in OFF state or remains unused for the predetermined period of time. When the result of judgement in step 826 is affirmative (step 826: YES), the routine skips to step 816 in order to resume charging the battery pack 5. It is desirable that the predetermined period of time for which the load current zero condition continues, which may be for example one minute, be determined while referring to the sampling times of the battery voltage and the battery temperature and also the actual use condition of the power tool 4.

When the result of judgement in step 826 is negative (step 826: NO), after setting the "trigger detection" flag (step 818), the microcomputer 60 outputs the charge disable signal to both the trigger detection circuit 43 and the charge output switching circuit 32 (step 851). Next, the microcomputer 60 judges whether or not the battery pack 5 is inserted into the insertion recess 2a of the power source unit 2 based on the indication of the "battery pack" flag (step 852). When the battery pack 5 is not inserted into the insertion recess 2a, the routine returns to step 803. On the other hand, when the battery pack 5 is inserted thereinto, the microcomputer 60 executes data processing needed to determine the near full charge condition and the full charge condition. This is because the determination of the full charge condition is to be continuously performed even if the power switch 4b is once turned ON during the charging operation and thus the battery pack 5 is not being charged.

To this end, the newly detected battery temperature Tin is detected from the battery temperature detecting circuit 52 during charging operation and the detected battery temperature is stored in the RAM 62 (step 853). Also, through the comparison of the newly detected battery temperature Tin with the earlier detected battery temperatures, the battery temperature minimum value T(min) is determined and stored in the RAM 62 (step 854).

The newest BTG dT/dt is further computed (step 855). Through comparison of the newest BTG dT/dt with the earlier computed BTGs, the BTG minimum value dT/dt (min) is determined and stored in the RAM 62 (step 856).

Next, the microcomputer 60 judges whether or not the newest BTG dT/dt has exceeded a sum of the predetermined value Q1 and the BTG minimum value dT/dt(min) (step 857). When the result of judgement in step 857 is affirmative (step 857: YES), then the microcomputer 60 determines that the battery pack 2 has reached the near full charge condition. In this case, because the full charge condition follows shortly after the near full charge condition, the microcomputer 60 sets the "dT/dt continuity" flag (step 859), and thereafter executes the process in step 860. When the result of judgement in step 857 is negative (step 857:NO), the microcomputer 60 judges whether or not the newly detected battery temperature Tin has exceeded a sum of the predetermined value P1 and the battery temperature minimum value T(min) (step 858). When the result of judgement in step 858 is affirmative, the microcomputer 60 determines that the battery pack 2 has reached the near full charge condition and so the charge of the battery pack 2 will soon be completed. Accordingly, the microcomputer 60 sets the "dT/dt continuity" flag (step 859) and thereafter executes the process in step 860. In step 860, the microcomputer 60 judges whether or not the newly detected battery temperature Tin has exceeded a sum of the predetermined value P2 and the battery temperature minimum value T(min). When the result of judgement in step 860 is affirmative (step 860: YES), then the microcomputer 60 determines that the battery pack 2 has reached the full charge condition and executes the processes in steps 827, 828 and 829, whereupon charging of the battery pack 2 is ended.

When the result of judgement in step 858 is negative (step 858: NO) and also when the result of judgment in step 860 is negative (step 860:NO), then the microcomputer 60 judges whether or not the newly computed BTG dT/dt has exceeded a sum of the predetermined value Q2 and the BTG minimum value dT/dt(min) (step 861). When the result of judgement in step 861 is affirmative (step 861: YES), then the microcomputer 60 determines that the battery pack 2 has reached the full charge condition and thereafter executes the processes in steps 827, 828 and 829; whereupon the charging operation is ended. When the result of judgement in step 861 is negative (step 861: NO), then the routine returns to step 803.

Figure 6A:
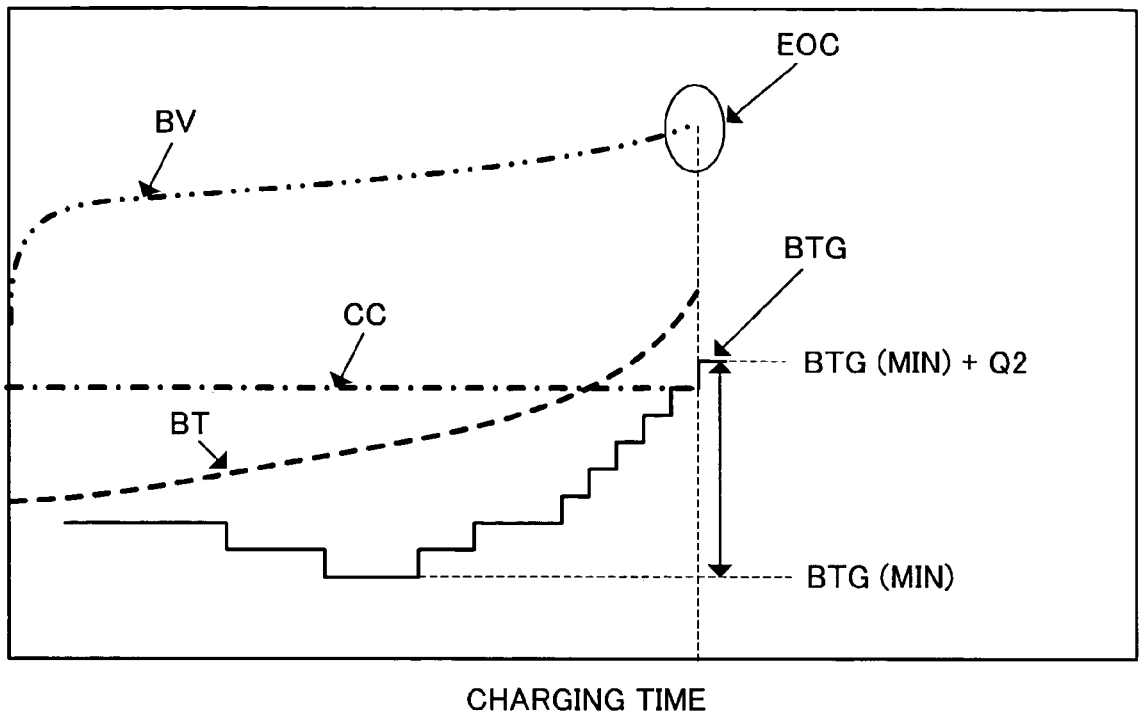
FIG. 6A is a graphical representation of a battery voltage (BV), a battery temperature (BT), a charge current (CC), and a battery temperature gradient (BTG) showing a charging progress of a battery pack when a power tool is not used during charging.
Figure 6B:
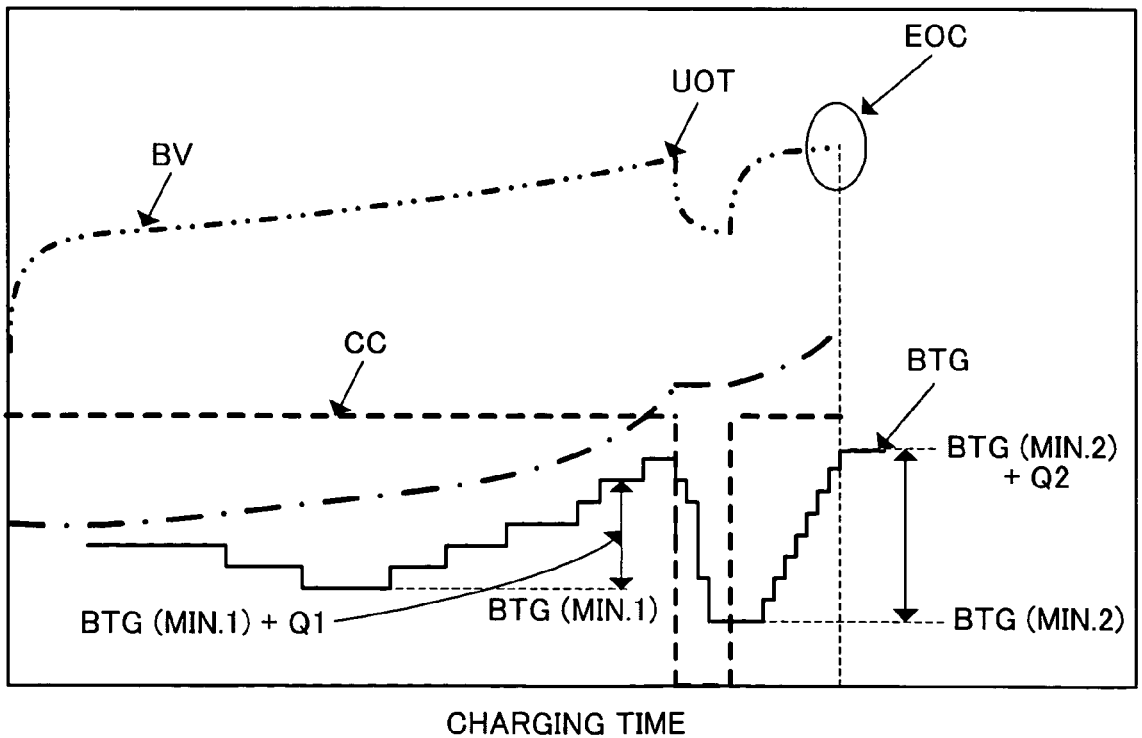
FIG. 6B is a graphical representation of a battery voltage (BV), a battery temperature (BT), a charge current (CC), and a battery temperature gradient (BTG) wherein charging the battery pack is interrupted after being charged to a near full charge condition.
Figure 6C:
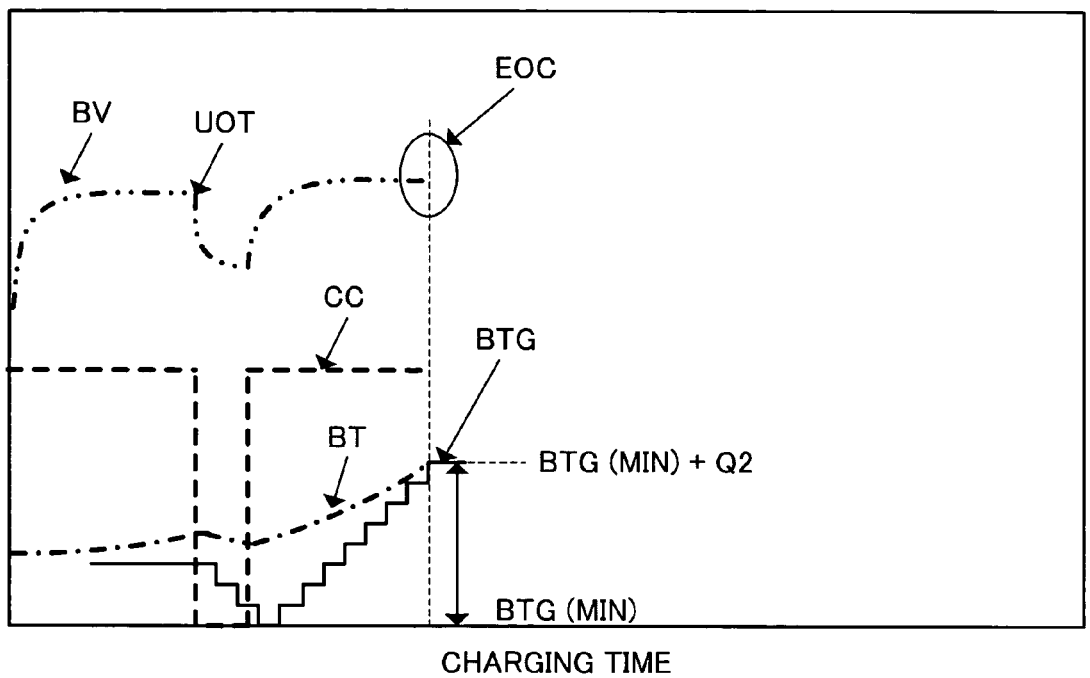
FIG. 6C is a graphical representation of a battery voltage (BV), a battery temperature (BT), a charge current (CC), and a battery temperature gradient (BTG) wherein charging the battery pack is interrupted before being charged to the near full charge condition.
Figure 6D:
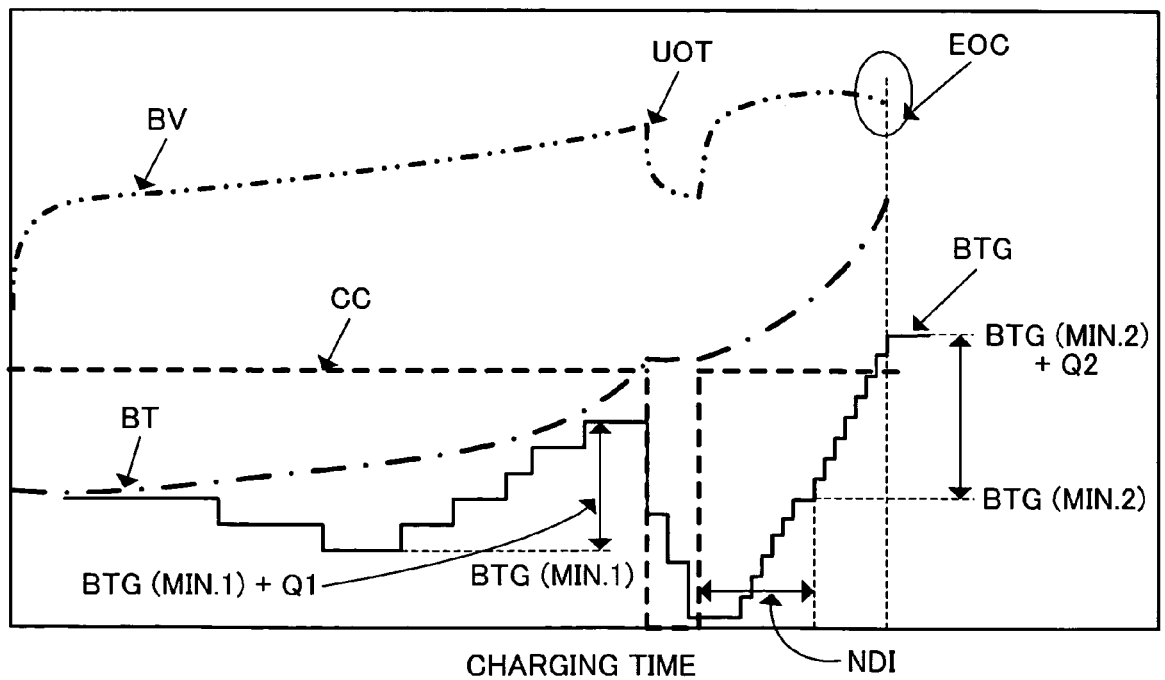
FIG. 6D is a graphical representation of a battery voltage (BV), a battery temperature (BT), a charge current (CC), and a battery temperature gradient (BTG) wherein charging the battery pack is interrupted after being charged to a near full charge condition and an end of charge (EOC) is determined upon providing a BTG non-detection interval (NDI) after charging the battery is resumed.
Figure 6E:
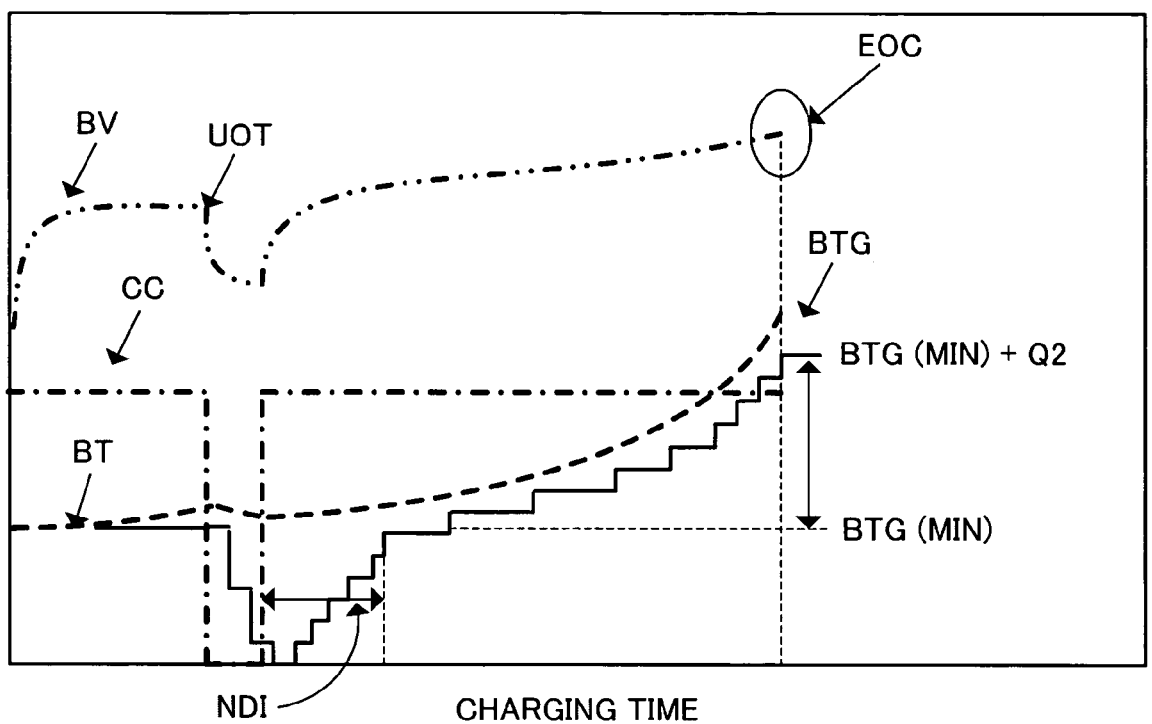
FIG. 6E is a graphical representation of a battery voltage (BV), a battery temperature (BT), a charge current (CC), and a battery temperature gradient (BTG) wherein charging the battery pack is interrupted before being charged to a near full charge condition and an end of charge (EOC) is determined upon providing a BTG non-detection interval (NDI) after charging the battery is resumed.
Figure 6F:
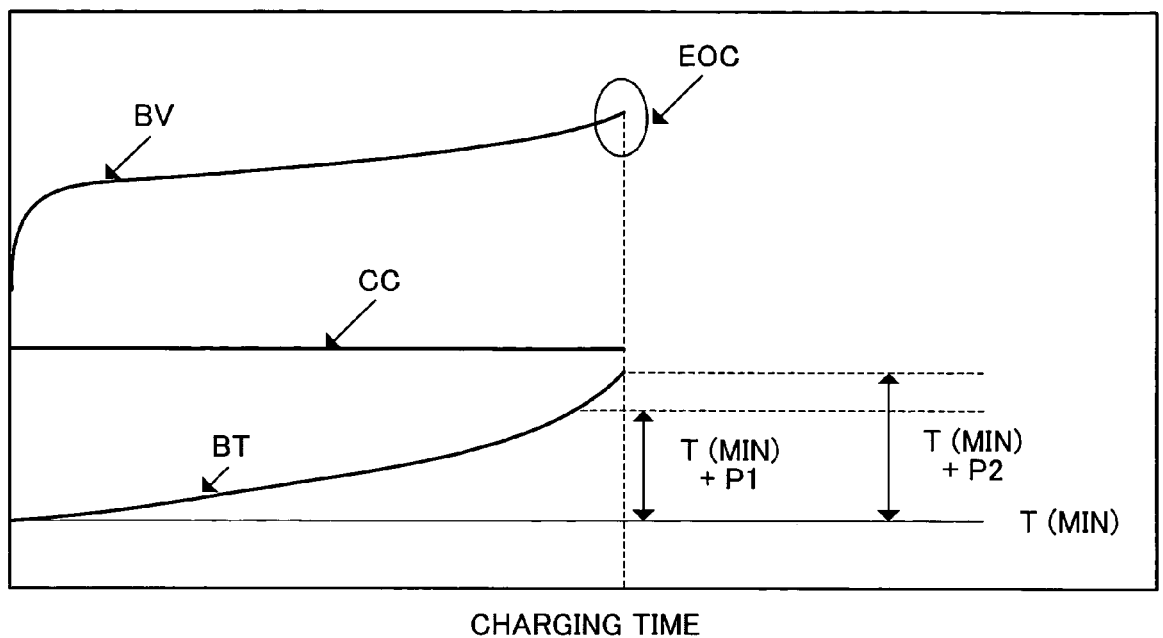
FIG. 6F is a graphical representation of a battery voltage (BV), a battery temperature (BT), and a charge current (CC) showing how a full charge condition is determined according to the second embodiment of the invention.
Figure 6G:
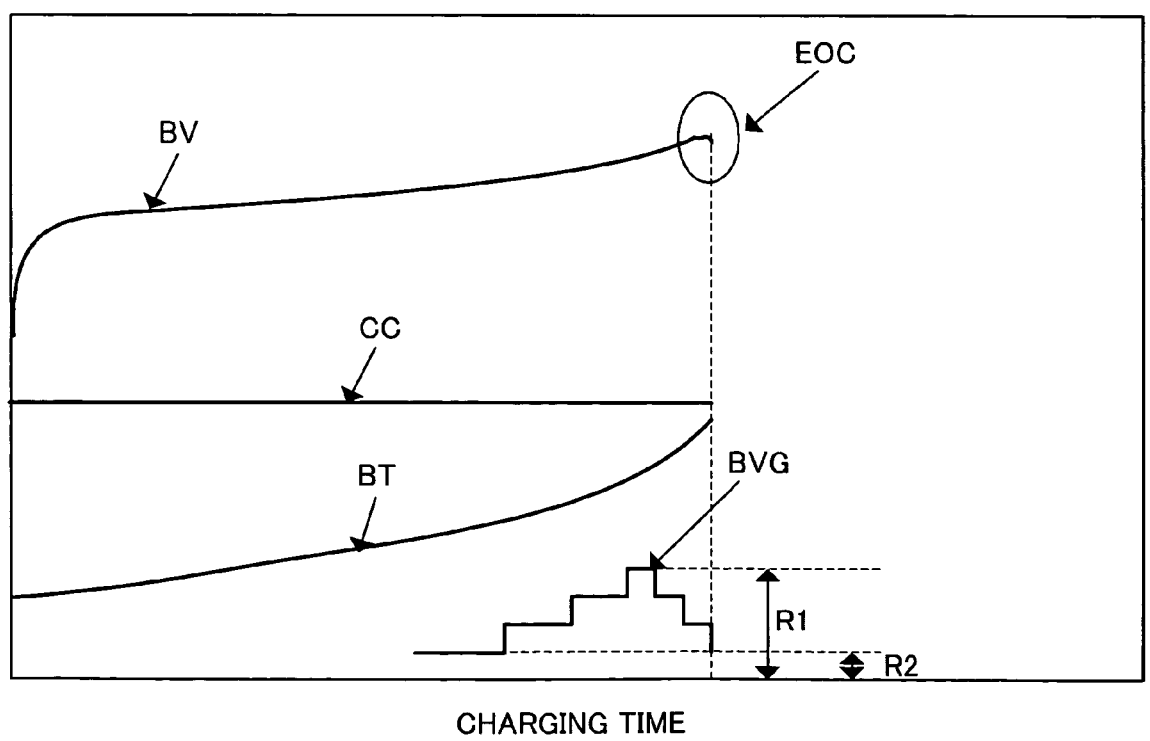
FIG. 6G is a graphical representation of a battery voltage (BV), a battery temperature (BT), a charge current (CC), and a battery voltage gradient (BVG) showing how a full charge condition is determined according to the second embodiment of the invention.

FIGS. 6A through 6G are graphical representations of battery voltage (BV), charge current (CC), battery temperature (BT), and battery temperature gradient (BTG that represents an analog-to-digital converted value) when the battery is being charged. FIG. 6A shows the case where the battery is continuously charged without interruption caused by the use of tool. The end of charge (EOC) determined when the BTG increases more than the predetermined value Q2 from the BTG minimal value, BTG(min), correctly indicates the full charge condition of the battery.

FIG. 6B shows the case where continuous charge of the battery pack 5 is interrupted for a certain period of time due to the use of tool (UOT). Immediately before the charge of the battery pack 5 is interrupted, the battery pack 5 has been charged up to a near full charge condition. The near full charge condition corresponds to a level of BTG(min.1)+Q1 where BTG(min.1) represents the BTG minimum value recorded before the interruption. The EOC determined when the BTG increases more than the predetermined value Q2 from the BTG(min.2) correctly indicates the full charge condition of the battery pack 5 where BTG(min.2) represents the BTG minimum value recorded after the interruption. As described previously, the predetermined value Q1 is close to but smaller than the predetermined value Q2 (Q2>Q1). From the case indicated in FIG. 6B, it can be understood that if the continuous charge of the battery pack 5 is interrupted when the battery pack 5 has been charged to the near full charge condition, the full charge condition of the battery pack 5 can be correctly determined by applying the principle of determination of the EOC as described with reference to FIG. 6A. That is, the use of BTG(min.2) obtained through the continuous computation of the BTG is valid in determining the EOC.

FIG. 6C shows the case where continuous charging of the battery pack 5 is interrupted before the battery pack 5 has not yet been charged to the near full charge condition. The BT gradually lowers during interruption of charging but is turned to increase relatively abruptly after resumption of the charging operation. If the principle of determining the EOC as indicated in FIG. 6A is applied to the case of FIG. 6C while continuously computing the BTGs and updating the BTG(min) even during interruption, the battery pack 5 is in an undercharged condition at the EOC.

FIGS. 6D and 6E also show the cases where charging the battery pack 5 is interrupted. In the case of FIG. 6D, charging the battery pack 5 is interrupted immediately after the battery pack 5 has reached the near full charge condition similar to the case of FIG. 6B. On the other hand, in the case of FIG. 6E, charging the battery pack 5 is interrupted before the battery pack 5 has reached to the near full charge condition similar to the case of FIG. 6C. In both cases, a non-computing interval (NCI) of BTG is set immediately after charging the battery pack 5 is resumed. By posing the NDI of BTG set to a proper duration of time immediately after the resumption of the charging operation, the EOC determined when the BTG increases more than the predetermined value Q2 from the BGT(min) correctly indicates the full charge condition of the battery pack 5 in the case of FIG. 6E. However, if the NDI of the same duration is similarly posed in the case of FIG. 6D, the battery pack 5 results in an overcharged condition at the EOC. The fact known from FIGS. 4A through 4E are the basis of the second embodiment of the invention.

While the invention has been described in detail with reference to specific embodiments thereof, it would be apparent to those skilled in the art that various changes and modifications may be made therein without departing from the spirit of the invention, the scope of which is defined by the attached claims.

For example, in the flowchart described above, step 834 shown in FIG. 4C can be omitted. Further, the embodiments describe that the DC power source unit 100 charges using the same charge current batteries regardless of the battery voltage. However, the charge current could be controlled in accordance with the battery voltage. Alternatively, the charge current can be controlled to charge battery packs 5 with different battery voltages in accordance with the maximum capacity of the switching power source 10. Explained in more detail, the average charge current is made small in accordance with the number of cells in the battery pack 5 to enhance the cycle life characteristic in accordance with increase in the number of cells.

What is claimed is:

1. A DC power source unit used as a power source of a tool and having a charging function for charging a battery pack used as an alternative power source of the tool, the tool having a power switch, the DC power source unit comprising:
    a battery pack connecting portion that connects the battery pack to charge with DC power;
    an adapter that supplies DC power to the tool;
    a power output switching circuit that switches between supplying the DC power to the tool through the adapter and charging the battery pack;
    a cooling device that cools the battery pack;
    a battery temperature detector that detects at every predetermined timing a temperature of the battery pack and outputs a temperature signal indicative of the temperature of the battery pack;
    a first storage device that stores the temperature signal output from the battery temperature detector;
    battery temperature gradient computing means for periodically computing a battery temperature gradient based on a currently detected temperature signal and an earlier detected battery temperature signal and outputting at every predetermined timing a BTG signal indicative of the battery temperature gradient;
    a second storage device that stores the BTG signal output from the battery temperature gradient computing means; and
    minimum value storing means for storing and updating a minimum value of the BTG signal amongst BTG signals ever computed by the battery temperature gradient computing means, wherein the minimum value storing means does not update the minimum value of the BTG signal for a predetermined duration of time from a time when the power output switching circuit starts supplying the DC power to the tool to a time when a predetermined period of time has expired from resumption of charge of the battery pack immediately after supplying the DC power to the tool is ended.

2. The DC power source unit according to claim 1, wherein the minimum value storing means does not update the minimum value of the BTG signal when the power output switching circuit is supplying the DC power to the tool.

3. The DC power source unit according to claim 1, further comprising battery pack discriminating means for discriminating a type of battery pack based on temperature rise of the battery pack when the battery pack is charged while being cooled by the cooling device, the battery pack discriminating means determining that the battery pack has cooling effect when the minimum value of the BTG signal stored in the minimum value storing means is lower than a critical value when the temperature signal output from the battery temperature detector indicates a predetermined temperature and that the battery pack does not have cooling effect when the minimum value of the BTG signal stored in the minimum value storing means is above the critical value when the temperature signal output from the battery temperature detector indicates the predetermined temperature.

4. The DC power source unit according to claim 1, further comprising charging current setting means for setting a charging current to be applied to the battery pack, wherein when the battery pack discriminating means determines that the battery pack has cooling effect, the charging current setting means sets a charging current having a first level, and when the battery pack discriminating means determines that the battery pack has no cooling effect, the charging current setting means sets a charging current having a second level lower than the first level.

5. The DC power source unit according to claim 4, wherein when the battery pack discriminating means determines that the battery pack has cooling effect and when the temperature signal output from the battery temperature detector indicates that the battery pack is high temperature as compared with a predetermined value, the charging current setting means sets a charging current having a third level lower than the first level but higher than the second level.

6. The DC power source unit according to claim 3, wherein the predetermined temperature is set lower than the predetermined value used as a criteria for determining whether the battery pack is high temperature.

7. The DC power source unit according to claim 1, further comprising a trigger detector that detects that the power switch of the tool is turned ON and outputs an ON signal indicative of ON of the power switch to the power output switching circuit, wherein in response to the ON signal, the power output switching circuit allows the DC power to be supplied to the tool and prohibits the battery pack from being charged.

8. A DC power source unit used as a power source of a tool and having a charging function for charging a battery pack used as an alternative power source of the tool, the tool having a power switch, the DC power source unit comprising:
    a battery pack connecting portion that connects the battery pack to charge with DC power;
    an adapter that supplies DC power to the tool;
    a power output switching circuit that switches between supplying the DC power to the tool through the adapter and charging the battery pack;

a battery temperature detector that detects at every predetermined timing a temperature of the battery pack and outputs a temperature signal indicative of the temperature of the battery pack;

a first storage device that stores the temperature signal output from the battery temperature detector;

battery temperature gradient computing means for periodically computing a battery temperature gradient based on a currently detected temperature signal and an earlier detected battery temperature signal and outputting at every predetermined timing a BTG signal indicative of the battery temperature gradient;

a second storage device that stores the BTG signal output from the battery temperature gradient computing means;

minimum value storing means for storing and updating a minimum value of the BTG signal amongst BTG signals ever computed by the battery temperature gradient computing means;

full charge determining means for determining that the battery pack has reached a full charge condition when a newest BTG signal has a value greater by a predetermined full charge discriminating value than the minimum value of the BTG signal stored in the minimum value storing means; and control means for controlling the full charge determining means so that when the power output switching circuit supplies the DC power to the tool during the battery pack is being charged, and thereafter stops supplying the DC power to the tool and resumes charging the battery pack, the full charge determining means is disabled before expiration of a predetermined period of time from resumption of charging the battery pack.

9. The DC power source unit according to claim 8, wherein the control means controls the full charge determining means so as to be disabled if the battery pack has not yet reached a reference charge level when charging the battery pack is interrupted by the power output switching circuit.

10. The DC power source unit according to claim 9, wherein when the power output switching circuit supplies the DC power to the tool during the battery pack is being charged, and thereafter stops supplying the DC power to the tool and resumes charging the battery pack, the control means controls the full charge determining means so as to be operable immediately after resumption of charging the battery pack if the battery pack has reached the reference charge level when charging the battery pack is interrupted by the power output switching circuit.

11. The DC power source unit according to claim 9, further comprising:

a battery voltage detector that detects a voltage of the battery pack and outputs a voltage signal indicative of the voltage of the battery pack; and residual battery capacity detecting means for detecting residual capacity of the battery pack based on the voltage signal output from the battery voltage detector and outputting a residual capacity signal indicative of the residual capacity of the battery pack, wherein when the power output switching circuit supplies the DC power to the tool during the battery pack is being charged, and thereafter stops supplying the DC power to the tool and resumes charging the battery pack, the battery temperature gradient computing means continues computing the battery temperature gradient without interruption if the residual capacity signal indicates that the battery pack has a residual capacity more than a predetermined level.

12. A DC power source unit used as a power source of a tool and having a charging function for charging a battery pack used as an alternative power source of the tool, the tool having a power switch, the DC power source unit comprising:

a battery pack connecting portion that connects the battery pack to charge with DC power;

an adapter that supplies DC power to the tool;

a power output switching circuit that switches between supplying the DC power to the tool through the adapter and charging the battery pack;

a battery temperature detector that detects at every predetermined timing a temperature of the battery pack and outputs a temperature signal indicative of the temperature of the battery pack;

a first storage device that stores the temperature signal output from the battery temperature detector;

battery temperature gradient computing means for periodically computing a battery temperature gradient based on a currently detected temperature signal and an earlier detected battery temperature signal and outputting at every predetermined timing a BTG signal indicative of the battery temperature gradient;

a second storage device that stores the BTG signal output from the battery temperature gradient computing means;

minimum value storing means for storing and updating a minimum value of the BTG signal amongst BTG signals ever computed by the battery temperature gradient computing means;

full charge determining means for determining that the battery pack has reached a full charge condition when a newest BTG signal has a value greater than a sum of a predetermined full charge discriminating BTG value and the minimum value of the BTG signal stored in the minimum value storing means or when a newest temperature signal output from the battery temperature detector has exceeded a predetermined full charge discriminating battery temperature value; and control means for controlling the battery temperature gradient computing means so that when the power output switching circuit supplies the DC power to the tool during the battery pack is being charged, and thereafter stops supplying the DC power to the tool and resumes charging the battery pack, the battery temperature gradient computing means does not compute the battery temperature gradient for a predetermined period of time if the newest temperature signal indicates that the battery temperature has not exceeded a near full charge battery temperature value lower than the predetermined full charge discriminating battery temperature value.

13. The DC power source unit according to claim 12, further comprising:

a battery voltage detector that detects a voltage of the battery pack and outputs a voltage signal indicative of the voltage of the battery pack; and residual battery capacity detecting means for detecting residual capacity of the battery pack based on the voltage signal output from the battery voltage detector and outputting a residual capacity signal indicative of the residual capacity of the battery pack, wherein when the power output switching circuit supplies the DC power to the tool during the battery pack is being charged, and thereafter stops supplying the DC power to the tool and resumes charging the battery pack, the battery temperature gradient computing means continues computing the battery temperature gradient without interruption if the residual capacity signal indicates that the battery pack has a residual capacity more than a predetermined level.

14. A DC power source unit used as a power source of a tool and having a charging function for charging a battery pack used as an alternative power source of the tool, the tool having a power switch, the DC power source unit comprising:

a battery pack connecting portion that connects the battery pack to charge with DC power;

an adapter that supplies DC power to the tool;

a power output switching circuit that switches between supplying the DC power to the tool through the adapter and charging the battery pack;

a battery voltage detector that detects at every predetermined timing a voltage of the battery pack and outputs a voltage signal indicative of the voltage of the battery pack;

a first storage device that stores the voltage signal output from the battery voltage detector;

battery voltage gradient computing means for periodically computing a battery voltage gradient based on a currently detected voltage signal and an earlier detected voltage signal and outputting at every predetermined timing a BVG signal indicative of the battery voltage gradient;

a second storage device that stores the BVG signal output from the battery voltage gradient computing means;

full charge determining means for determining that the battery pack has reached a full charge condition when a newest BVG signal has exceeded a first predetermined value and thereafter fallen below a second predetermined value smaller than the first predetermined value; and control means for controlling the battery voltage gradient computing means so that when the power output switching circuit supplies the DC power to the tool during the battery pack is being charged, and thereafter stops supplying the DC power to the tool and resumes charging the battery pack, the battery voltage gradient computing means does not compute the battery voltage gradient for a predetermined period of time if a newest BVG signal indicates that a newest battery voltage gradient has not exceeded the first predetermined value.

* * * * *